United States Patent
Wu et al.

(10) Patent No.: US 11,347,265 B2
(45) Date of Patent: *May 31, 2022

(54) FLEXIBLE TOUCH DISPLAY COVER WINDOW LAYER DESIGN

(71) Applicant: InnoLux Corporation, Miao-Li County (TW)

(72) Inventors: Yuan-Lin Wu, Miao-Li County (TW); Kuan-Feng Lee, Miao-Li County (TW)

(73) Assignee: InnoLux Corporation, Miao-Li County (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/131,675

(22) Filed: Dec. 22, 2020

(65) Prior Publication Data
US 2021/0109570 A1 Apr. 15, 2021

Related U.S. Application Data

(63) Continuation of application No. 15/698,744, filed on Sep. 8, 2017, now Pat. No. 10,901,461.

(60) Provisional application No. 62/512,733, filed on May 31, 2017, provisional application No. 62/500,539, filed on May 3, 2017.

(51) Int. Cl.
*G06F 3/044* (2006.01)
*G06F 1/16* (2006.01)

(52) U.S. Cl.
CPC .......... *G06F 1/1643* (2013.01); *G06F 3/044* (2013.01); *G06F 3/0443* (2019.05); *G06F 3/0446* (2019.05); *G06F 3/0448* (2019.05); *G06F 1/1652* (2013.01); *G06F 2203/04102* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 2007/0085837 A1* | 4/2007 | Ricks | G06F 3/045 345/173 |
| 2012/0098782 A1* | 4/2012 | Nam | G06F 3/0446 345/174 |
| 2012/0162099 A1* | 6/2012 | Yoo | G06F 3/0443 345/173 |
| 2015/0018045 A1* | 1/2015 | Cha | H04M 1/185 455/566 |
| 2016/0172428 A1* | 6/2016 | Song | H01L 27/3276 257/99 |
| 2016/0320803 A1* | 11/2016 | Oh | B32B 7/12 |
| 2019/0004642 A1* | 1/2019 | Chen | G06F 3/0446 |
| 2019/0187846 A1* | 6/2019 | Du | H01L 51/5203 |
| 2019/0324574 A1* | 10/2019 | Schooley | G06F 1/266 |

* cited by examiner

*Primary Examiner* — Parul H Gupta
(74) *Attorney, Agent, or Firm* — Winston Hsu

(57) ABSTRACT

In one embodiment, a touch display device includes a substrate, a display layer, a touch layer and a cover window layer. The substrate includes a foldable region. The display layer is disposed on the substrate. The touch layer includes a plurality of touch units on the foldable region of the substrate. The cover window layer is disposed on the touch layer, wherein the cover window layer includes a plurality of patterns disposed on the foldable region of the substrate. At least one of the plurality of touch units partially overlaps with at least one of the plurality of patterns of the cover window layer.

16 Claims, 29 Drawing Sheets

Structure D

Structure E

Structure F

Structure G

FLEXIBLE TOUCH DISPLAY COVER WINDOW LAYER DESIGN

CROSS REFERENCE TO RELATED APPLICATIONS

This patent application is a continuation application and claims priority of U.S. patent application Ser. No. 15/698,744, filed on Sep. 8, 2017, which claims the benefit of U.S. Provisional Application Nos. 62/500,539, filed May 3, 2017, and 62/512,733, filed May 31, 2017, and each of which are hereby incorporated by reference in their entirety.

BACKGROUND OF THE DISCLOSURE

1. Field of the Disclosure

The present invention is generally related to flexible electronics, and in particular, flexible touch display devices.

2. Description of the Prior Art

Flexible electronics is an emerging technology that fabricates thin electronic components and devices on a foldable (or similarly, bendable, stretchable, or flexible) substrate. Flexible electronics offers many benefits over rigid electronics, including a small form factor, cost effectiveness, lightweight, durability, flexibility, and portability. The technology is gaining popularity because of its potential use in many electronics applications, including flexible displays, flexible touch panels, wearable electronic devices, among others.

Extensive studies have been made on the research and development of flexible displays and foldable touch panels. Flexible displays with a foldable touch panel, also referred to as a flexible touch display panel (TDP), shows promise in becoming the mainstream of next-generation portable applications and display systems. However, improvements in durability are still desired. For instance, and referring to FIGS. 1A-1B shown are schematic diagrams that illustrate stresses imposed on a cover window layer of flexible touch display devices, such as flexible touch display device 10. FIG. 1A shows the flexible touch display device 10 comprising a cover window layer 12 disposed over a touch display panel 14. FIG. 1A depicts the flexible touch display device 10 without any bending stress imposed on the cover window layer 12. FIG. 1B shows the flexible touch display device 10 under a bending stress, as represented by a stress symbol depicted as centrally located and proximal to the top surface of the cover window layer 12. In particular, the bending stress is primarily if not entirely imposed at the cover window layer 12.

SUMMARY OF THE DISCLOSURE

In one embodiment, a touch display device includes a substrate, a display layer, a touch layer and a cover window layer. The substrate includes a foldable region. The display layer is disposed on the substrate. The touch layer includes a plurality of touch units on the foldable region of the substrate. The cover window layer is disposed on the touch layer, wherein the cover window layer includes a plurality of patterns disposed on the foldable region of the substrate. At least one of the plurality of touch units partially overlaps with at least one of the plurality of patterns of the cover window layer.

In one embodiment, a touch display device includes a substrate, a display layer, a touch layer and a cover window layer. The substrate includes a foldable region. The display layer is disposed on the substrate. The touch layer includes a plurality of touch units on the foldable region of the substrate. The cover window layer is disposed on the touch layer, wherein the cover window layer includes a plurality of patterns disposed on the foldable region of the substrate. An area of at least one of the plurality of touch units is greater than an area of at least one of the plurality of patterns.

These and other aspects of the invention will be apparent from and elucidated with reference to the embodiment(s) described hereinafter.

BRIEF DESCRIPTION OF THE DRAWINGS

Many aspects of the invention can be better understood with reference to the following drawings, which are diagrammatic. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1A:
FIGS. 1A-1B are schematic diagrams that illustrate stresses imposed on a conventional cover window layer of a flexible touch display device.

Disclosed herein are certain embodiments of a flexible touch display device that uses select parameters for unit configurations in a foldable region and the arrangement of the units in both a cover window layer and a touch layer of the device. Through fine tuning of these parameters, a flexible touch display device may realize improvements in resistance to cracking upon contact at the cover window layer and generally improve the resistance to damage from bending the device. In one embodiment, a touch display device is disclosed, comprising: a substrate including a first region, wherein the first region is foldable. A display layer is disposed on the substrate. The touch display device also comprises a touch layer, including a plurality of touch units on the first region of the substrate. The touch display device further comprises a cover window layer disposed on the touch layer, wherein the cover window layer includes a plurality of first patterns on the first region of the substrate, wherein an area of at least one of the plurality of touch units is greater than an area of at least one of the plurality of first patterns.

In another embodiment, an apparatus is disclosed, the apparatus comprising a substrate that comprises at least a first region and a second region. The first region is more flexible than the second region. The apparatus further comprises first and second layers. The first layer is disposed over the first region, and comprises plural first units. The second layer is disposed over the first layer. The second layer comprises plural second units, wherein an area of at least one unit of the plural first units is greater than an area of at least one unit of the plural second units.

Having summarized certain features of a flexible touch display device of the present disclosure, reference will now be made in detail to the description of a flexible touch display device as illustrated in the drawings. While a flexible touch display device will be described in connection with these drawings, there is no intent to limit the flexible touch display device to the embodiment or embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents consistent with the disclosure as defined by the appended claims. Further, it should be appreciated in the context of the present disclosure that the claims are not necessarily limited to the particular embodiments set out in the description.

Both embodiments use patterned cover window layers with a fine-tuning of parameters among the cover window layer and touch layer to provide a robust flexible touch display device that mitigates the risk of cracking and/or damage from bending.

Figure 2:
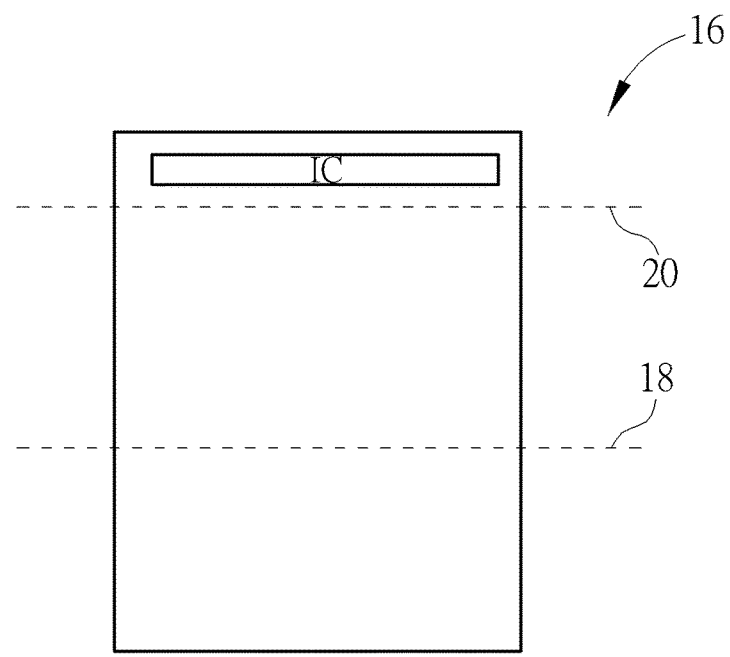
FIG. 2 is a schematic diagram that illustrates an embodiment of an example flexible touch display panel.
Figure 3A:
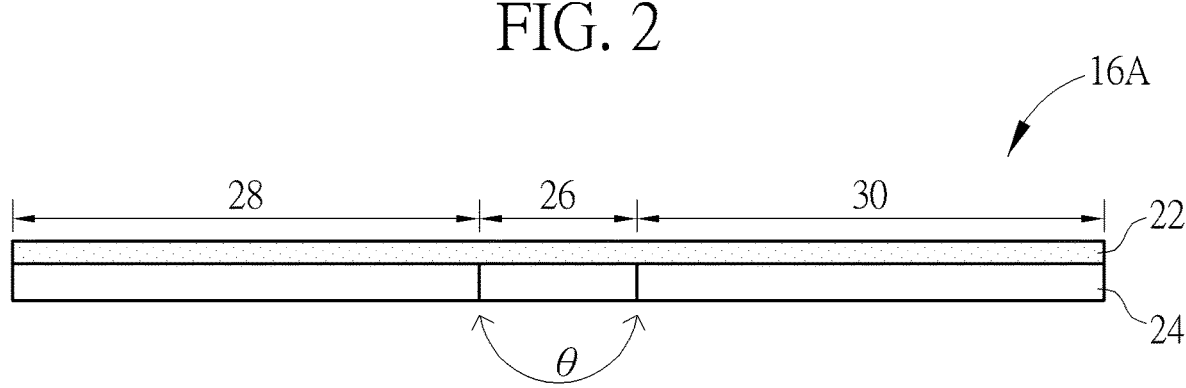
FIGS. 3A-3D are schematic diagrams that illustrate features of an embodiment of an example flexible touch display panel.
Figure 3B:
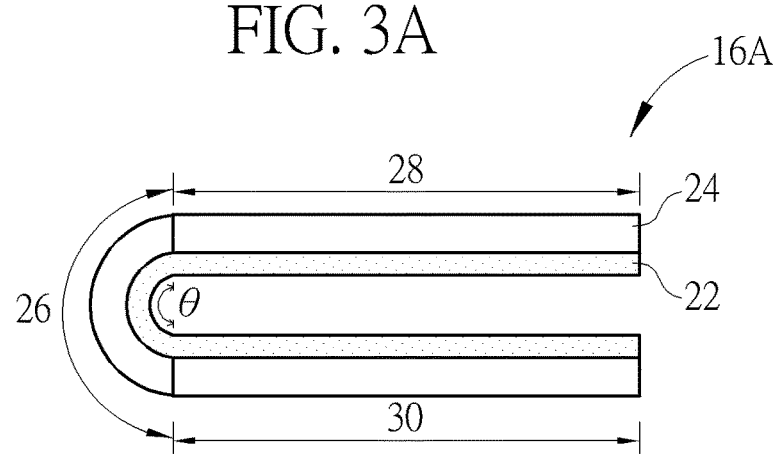
Figure 3C:
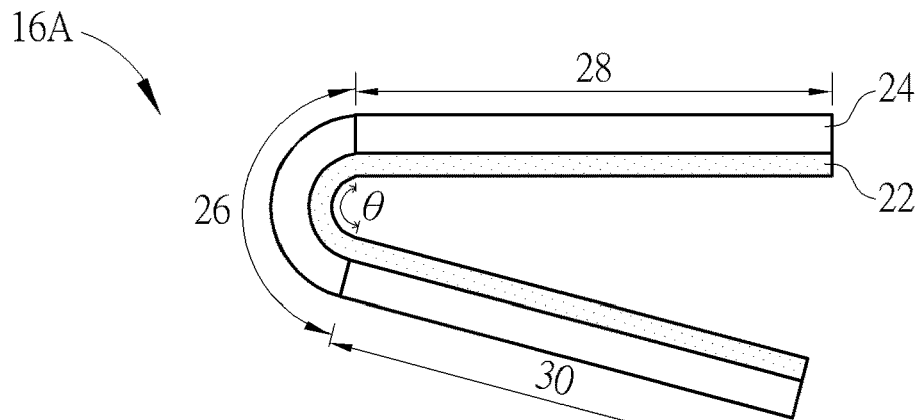
Figure 3D:
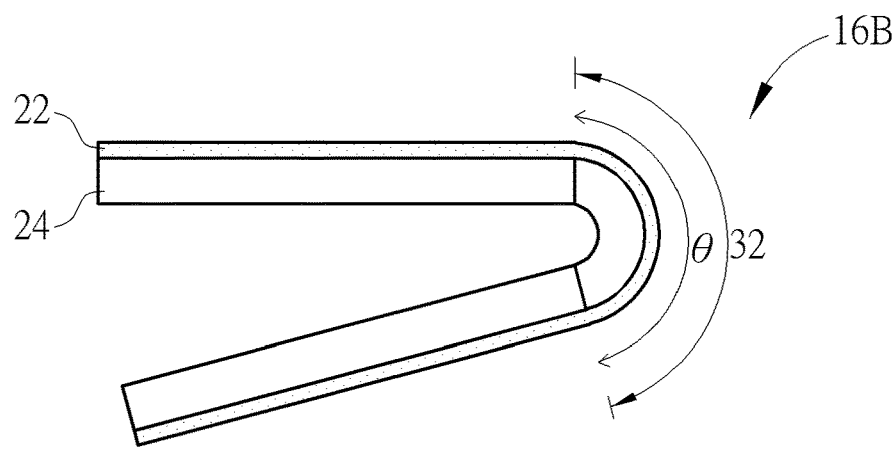
Figure 4:
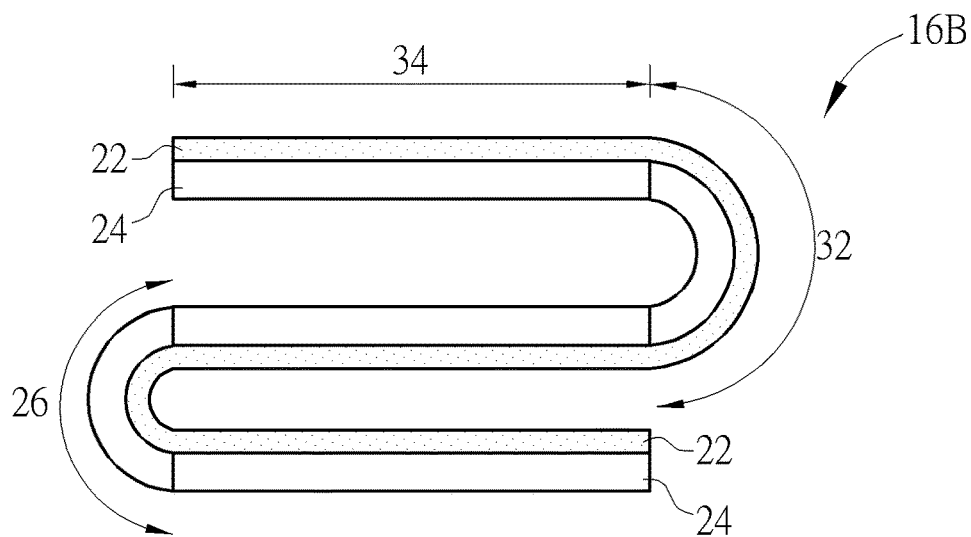
FIG. 4 is a schematic diagram that illustrates features of an embodiment of an example flexible touch display device including two folding types.

Attention is directed to FIGS. 2-4, which illustrate the bendability or foldability of certain embodiments of a flexible touch display device. Referring first to FIG. 2, shown is a schematic diagram that illustrates an example flexible touch display device 16. The flexible touch display device 16 comprises a flexible substrate providing flexible characteristics that enable the flexible touch display device 16 to be configured in a curved, bendable, foldable, rollable, or stretchable configuration. In the example depicted in FIG. 2, the flexible touch display device 16 comprises a folding axis 18 disposed approximately midway along the length of the flexible touch display device 16, and another folding axis 20 proximal to one end of the flexible touch display device 16, separating control circuitry (e.g., an integrated circuit) adjacent an end of the flexible touch display device 16 from the foldable region.

Referring now to FIGS. 3A-4, shown are schematic diagrams that illustrate features of an embodiment of an example flexible touch display device 16 (e.g., 16A and 16B). In FIG. 3A, the flexible touch display device 16A comprises a cover window layer 22 mounted on a touch display panel 24. Note that the cover window layer 22 is depicted FIGS. 3A-4 as a contiguous layer for simplicity in illustration, and is actually a patterned layer with plural units (protrusions or recesses), as explained below. The cover window layer 22 may contain silsequioxane resin, acrylate-based polymer, aluminum oxide, aluminum nitride, aluminum oxynitride, oxidized silicon, nitride silicone, urethane, urethane acrylates, or binder (polyesteracrylate, epoxyacrylate, urethaneacrylate and siloxane modified acrylate) cured by UV radiation. In the depicted example, the flexible touch display device 16A comprises a foldable region 26 and two adjacent flat regions 28 and 30, the foldable region 26 disposed between the flat regions 28 and 30. Note that reference to "flat" does not necessarily mean that the regions have a flat surface, particularly in the presence of protrusions when viewed on the microscopic level. Rather, flat refers to unbending, as opposed to foldable, characteristics or features of those regions. The foldable region 26 comprises a foldable angle θ, that comprises a foldable range between −180 degrees to +180 degrees. Referring to FIGS. 3B and 3C, the cover window layer 22 is folded inwardly, such that the cover window layer 22 in the flat regions 28 and 30 is face to face, and the foldable angle θ is referred to positive degrees. In FIG. 3B, the cover window layer 22 in the flat regions 28 and 30 is parallel, and the foldable angle θ is +180 degrees. Referring to FIG. 3D, the cover window layer 22 is folded outwardly to form a foldable region 32, such that the cover window layer 22 in the flat regions 28 and 30 is away from each other, and the foldable angle θ is referred to negative. Referring to FIG. 4, the flexible touch display device 16B includes two types of folding, inwardly folding and outwardly folding. That is, the cover window layer 22 is folded inwardly to form a foldable region 26, and is folded outwardly to form a foldable region 32.

Figure 5A:
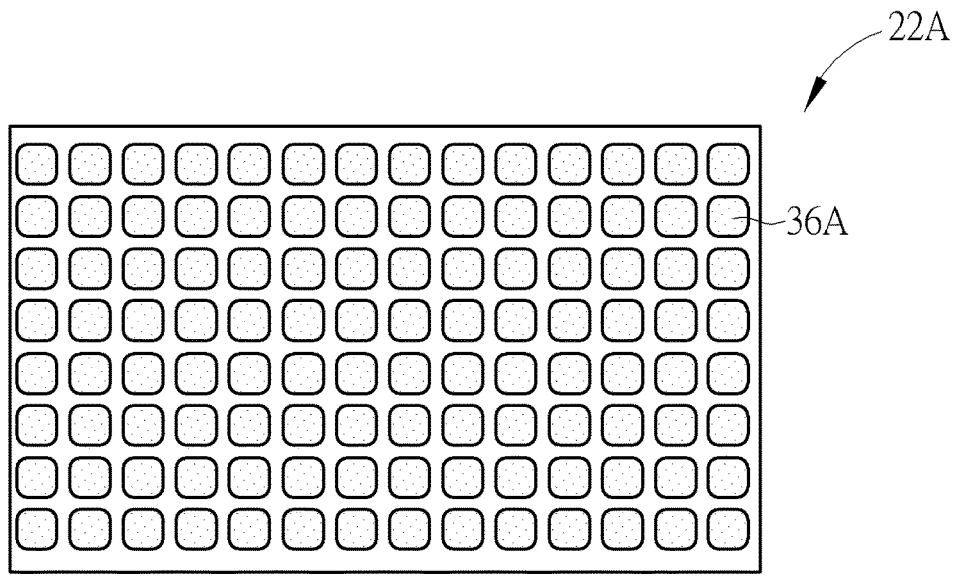
FIGS. 5A-5B are schematic diagrams that illustrate, in top plan view, example patterned, cover window layers for an embodiment of a flexible touch display device.
Figure 5B:
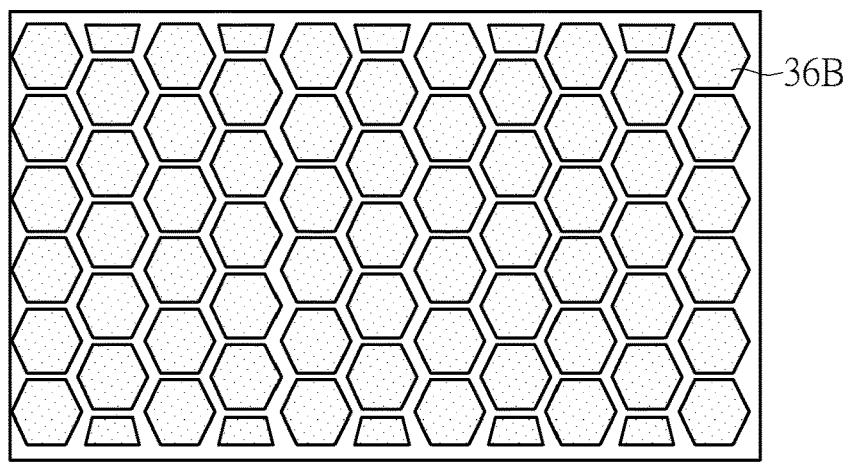
Figure 6A:
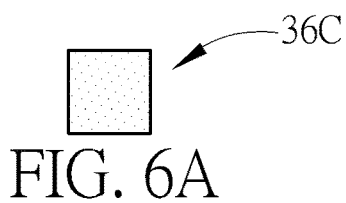
FIGS. 6A-6B are schematic diagrams that illustrate some example alternative unit configurations for a patterned window cover layer for an embodiment of a flexible touch display device.
Figure 6B:
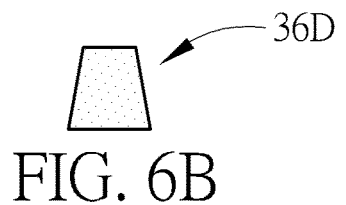

Having generally described the bendable or foldable nature of certain embodiments of a flexible touch display device 16 (and 16A and 16B), attention is now directed to FIGS. 5A-8B, which illustrate patterned, cover window layers for certain embodiments of flexible touch display devices. Referring FIGS. 5A-5B, shown (in top plan view) are example cover window layers 22A and 22B, respectively, with units of different configurations. In FIG. 5A, a cover window layer 22A is shown, including a matrix or array of units 36A (also, referred to herein as patterns) configured in the depicted embodiment as protrusions with an oblong (e.g., rounded-edge, rectangular) shape. In other words, the units 36A collectively comprise a cover window layer pattern depicted as aligned rows and columns of the units 36A. Each of the units 36A is shown having an oblong shape, though other shapes may be used as described below. Referring to FIG. 5B, shown is a cover window layer 22B comprising a matrix or array of units 36B configured in the depicted embodiment as protrusions in a six-sided (hexagonal) geometric shape or configuration. Though the units 36B in FIG. 5B are aligned along the depicted columns, alignment along each row is evident when viewed for every other unit 36B. Variations of the arrangement or patterns of units 36A, 36B are contemplated to be within the scope of the disclosure. For instance, and referring to FIGS. 6A-6B, shown are schematic diagrams that illustrate some alternative example unit shapes/configurations, including a rectangular or square-shaped unit 36C (FIG. 6A) or a frustum-shaped unit 36D (FIG. 6B), to name a few examples.

Figure 1B:
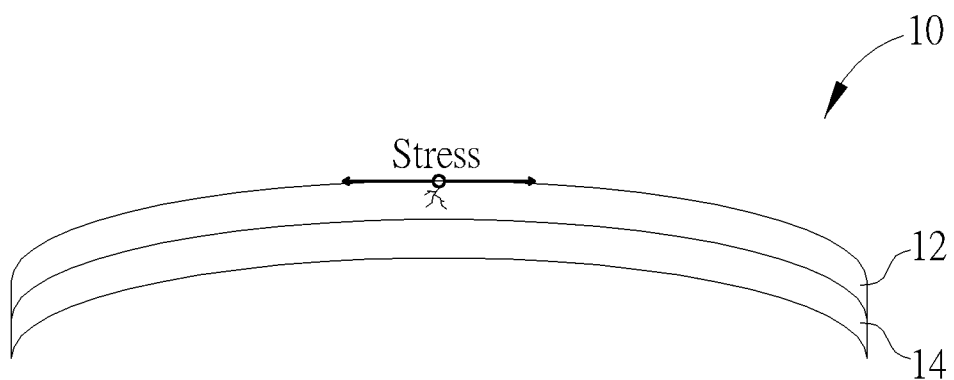
Figure 7A:
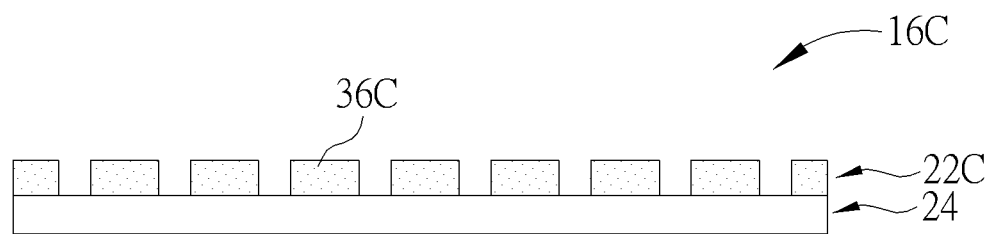
FIGS. 7A-7B are schematic diagrams that illustrate, in cross-sectional view, an embodiment of a flexible touch display device with a fully-etched cover window layer.
Figure 7B:
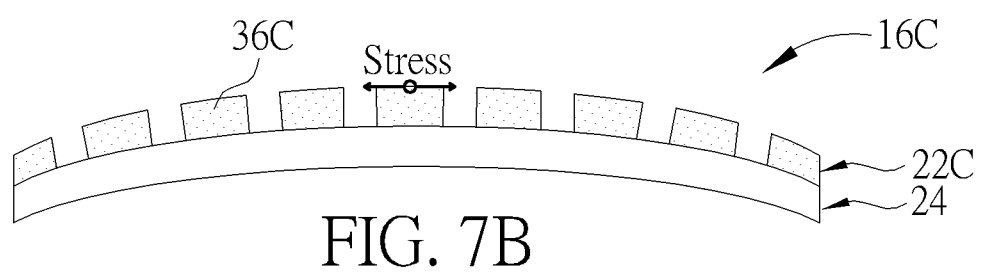
Figure 8A:
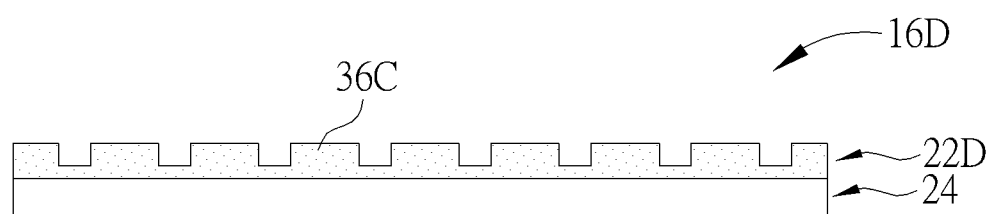
FIGS. 8A-8B are schematic diagrams that illustrate, in cross-sectional view, an embodiment of a flexible touch display device with a partially-etched cover window layer.
Figure 8B:
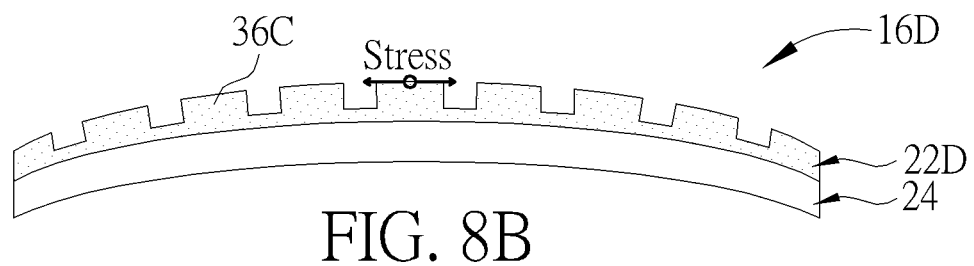

FIGS. 7A-8B show certain embodiments of flexible touch display devices 16C (FIGS. 7A-7B) and 16D (FIGS. 8A-8B), in cross-sectional view, having a patterned cover window layer 22 (e.g., similar to those shown in FIGS. 5A-5B) disposed on a touch display panel 24. In particular, FIGS. 7A-7B illustrate a patterned cover window layer 22C with units 36C formed through complete etching (e.g., exposing from above gapped surfaces of the touch display panel 24), with FIG. 7A illustrating no bending stresses and FIG. 7B illustrating bending stresses (as represented by the stress symbol on one of the units 36C of the cover window layer 22C). The patterned cover window layer 22C can release at least some of the cover window layer film stress when compared to a contiguous cover window layer (the latter as illustrated in FIG. 1B), reducing the probability of cracking of the cover window layer 22C. FIGS. 8A-8B show a flexible touch display device 16D in an unstressed and stressed (bended) configuration, respectively. In this example, the cover window layer 22D is disposed on the touch display panel 24, and the cover window layer 22D is partially etched (e.g., leaving no surfaces, between the units 36C, of the flexible touch display device 10 exposed from the top). Like the patterned cover window layer 22C in FIGS. 7A-7B, the patterned cover window layer 22D serves to reduce the bending stresses commonly observed with conventional cover window layers (e.g., in FIG. 1B).

Figure 9A:
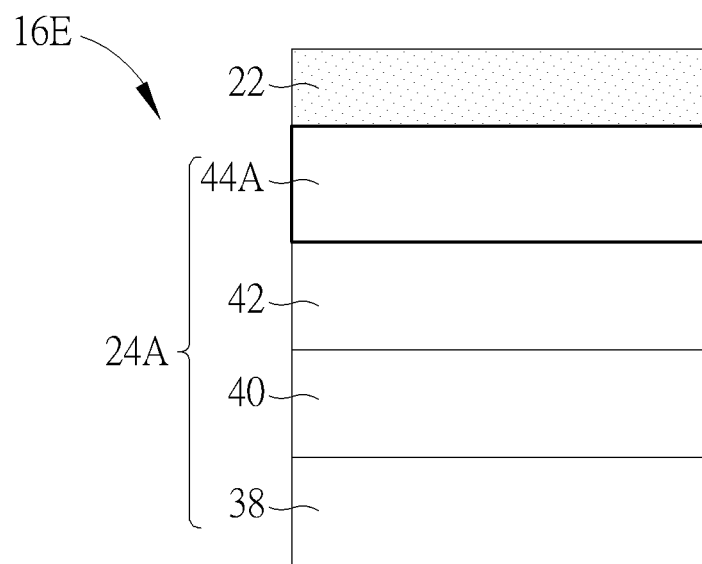
FIGS. 9A-9B are schematic diagrams that illustrate an embodiment of a type 1 flexible touch display device.
Figure 9B:
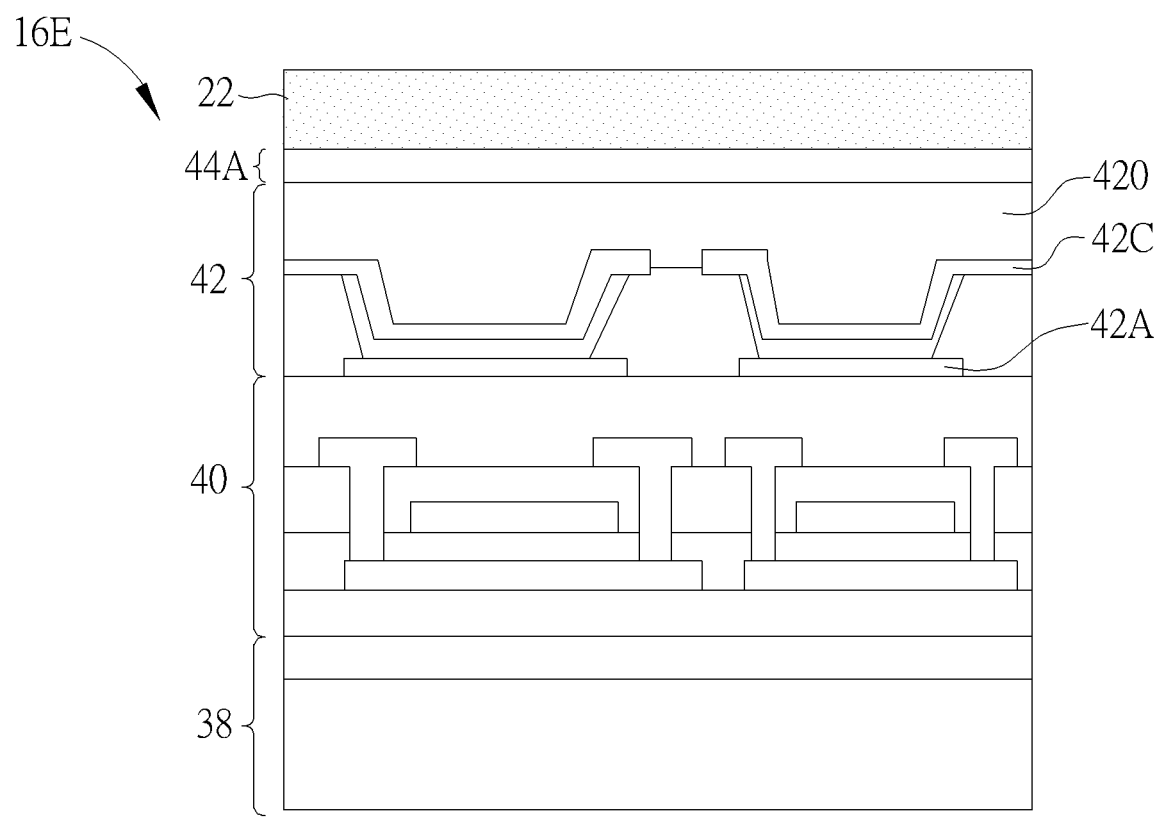

Having described certain features of the cover window layer for certain embodiments of a flexible touch display device, attention is now directed to FIGS. 9A-11B, which provide additional detail of certain embodiments of flexible touch display devices, and in particular, the touch display panel 24. FIGS. 9A-11B illustrate various types of touch display panels 24 for certain embodiments of flexible touch display devices 16 (e.g., 16E-16G). For all of the flexible touch display devices 16 in FIGS. 9A-11B, there is a top patterned (though depicted as contiguous for simplicity of illustration) cover window layer 22, but three different touch display panel structure types. Referring to FIGS. 9A-9B, shown is a flexible touch display device 16E comprising a type 1 flexible touch display panel 24A having a structure that comprises, from bottom layer to top layer, a substrate 38, a circuit layer 40, a display layer 42, and a touch layer 44A. Note that the touch layer 44A is depicted in FIGS. 9A and 9B as a contiguous layer for simplicity in illustration, and is actually a patterned layer with plural touch units, as explained below. In addition, the touch layer 44A can be a single layer, can include two layers or multiple layers. The panel structure of FIGS. 9A-9B is also referred to as a touch on display (TOD) and out-cell touch type configuration. Referring in particular to FIG. 9B, the substrate 38 is depicted with a supporting film and a flexible substrate disposed over (or on) the supporting film. Other components of the substrate 38 may include supporting film glue. The circuit layer 40 is depicted with a thin film semiconductor layer with sources and gates sandwiched between two buffer layers. For instance, the circuit layer 40 includes a thin film transistor, signal trace, buffer layer, etc. The display layer 42 can comprise cathode 42C and anode 42A structures and an encapsulation layer 420 disposed over the structures. The touch layer 44A is disposed over the display layer 42 (e.g., over the encapsulation layer 420). In other words, the type 1 flexible touch display panel 24A comprises a touch layer 44A on the display layer 42, including directly on (touch on display) and indirectly on (out-cell touch, adhesive layer between the touch layer 44A and the display layer 42).

Figure 10A:
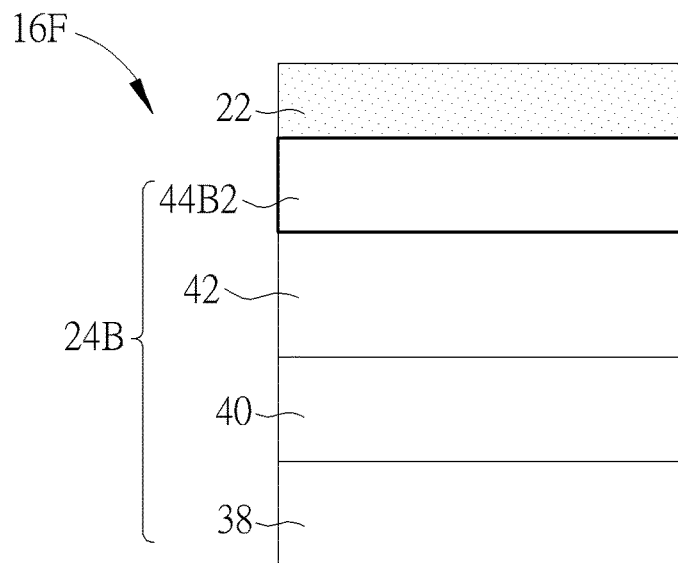
FIGS. 10A-10B are schematic diagrams that illustrate an embodiment of a type 2 flexible touch display device.
Figure 10B:
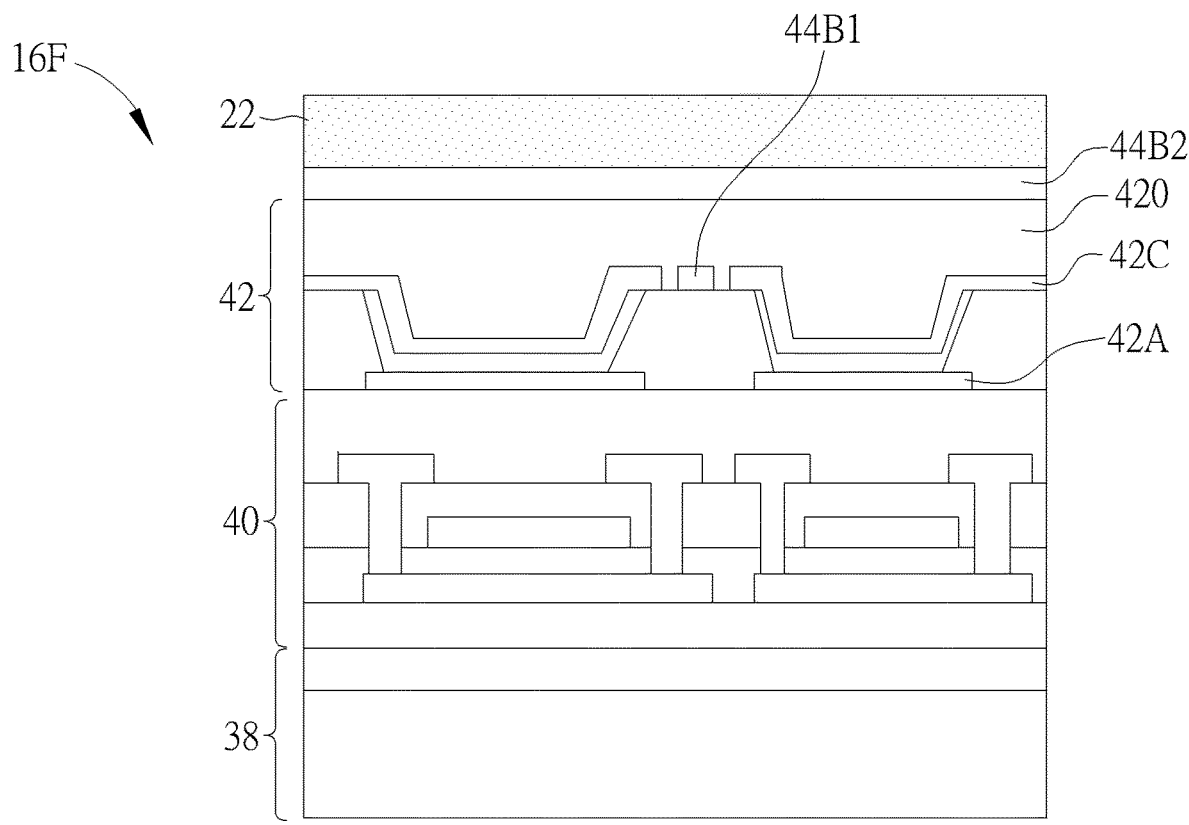

Referring now to FIGS. 10A-10B, shown is a flexible touch display device 16F comprising a type 2 flexible touch display panel 24B. The panel 24B comprises a structure that comprises, from bottom layer to top layer, the substrate 38, the circuit layer 40, a display layer 42 (including a first touch layer 44B1), and a second touch layer 44B2. Note that the first touch layer 44B1 and the second touch layer 44B2 are depicted in FIGS. 10A and 10B as a contiguous layer for simplicity in illustration, and are actually a patterned layer with plural touch units, as explained below. Referring in particular to FIG. 10B, the substrate 38 is depicted with a supporting film and a flexible substrate disposed over (or on) the supporting film. The circuit layer 40 is depicted with a thin film semiconductor layer with sources and gates sandwiched between two buffer layers. The display layer 42 comprises cathode and anode structures and an encapsulation layer disposed over the structures. The first touch layer 44B1 can be in the display layer. For example, the first touch layer 44B1 can be formed by the same process and by the same layer with the anode 42A or the cathode 42C of the display layer 42. FIG. 10B shows that the first touch layer 44B1 is formed by the same process and by the same layer with the cathode 42C. The second touch layer 44B2 is disposed between the display layer 42 and the cover window layer 22. In other words, the touch layer is partially in the display layer 42, partially on the display layer 42. Thus, the panel structure of FIGS. 10A-10B is also referred to as a hybrid touch type configuration.

Figure 11A:
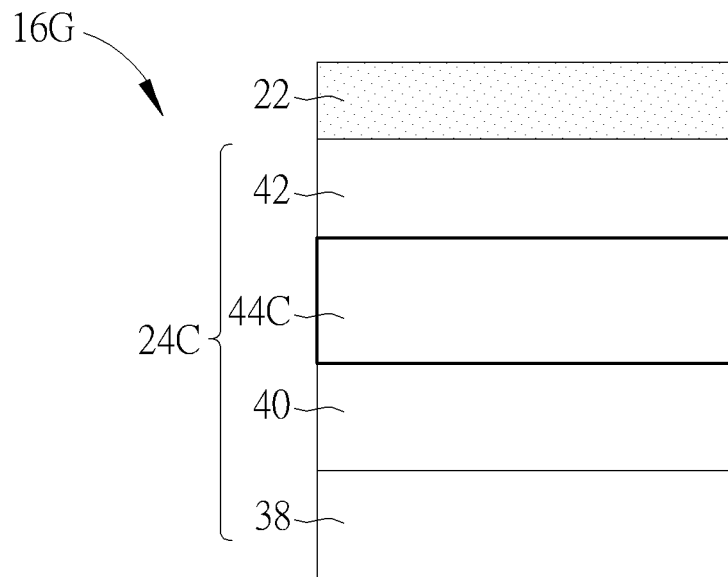
FIGS. 11A-11B are schematic diagrams that illustrate an embodiment of a type 3 flexible touch display device.
Figure 11B:
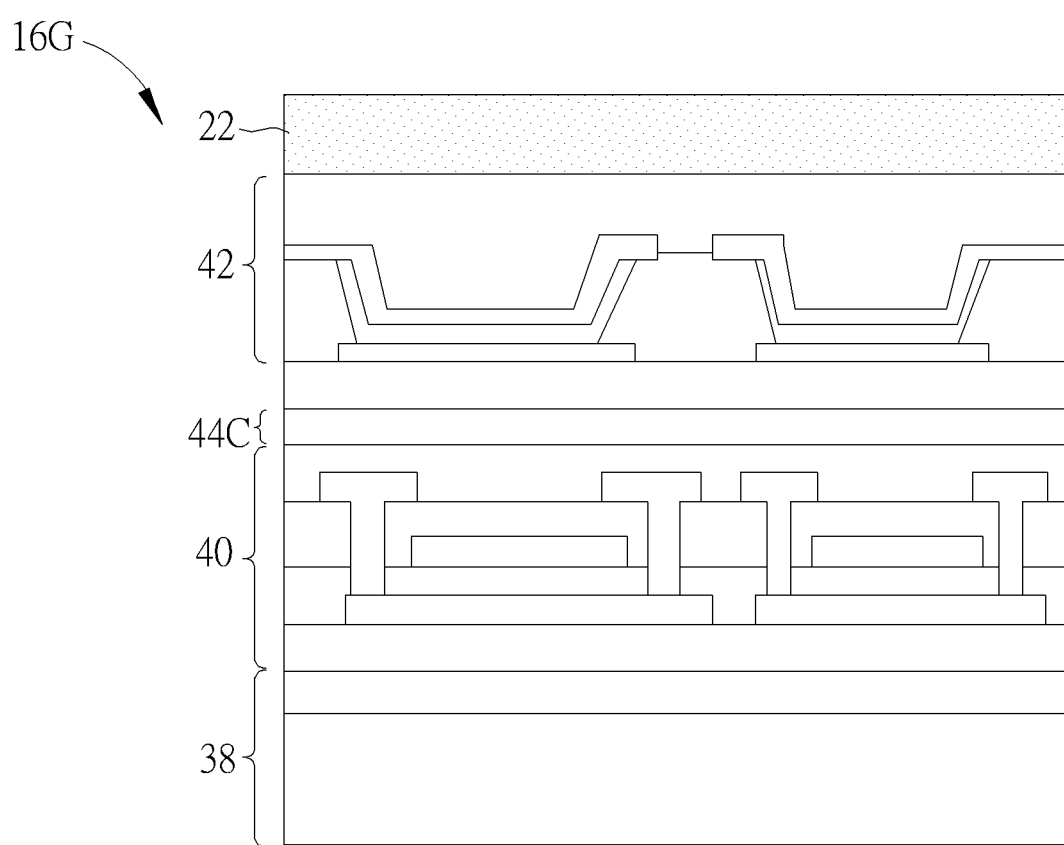

FIGS. 11A-11B are schematic diagrams that illustrate a flexible touch display device 16G comprising a type 3 flexible touch display panel 24C. The panel 24C comprises a structure that comprises, from bottom layer to top layer, the substrate 38, the circuit layer 40, a touch layer 44C, and the display layer 42. Note that the touch layer 44C is depicted in FIGS. 11A and 11B as a contiguous layer for simplicity in illustration, and are actually a patterned layer with plural touch units, as explained below. The panel structure of FIGS. 11A-11B is also referred to as a touch in display (TID) type configuration. Referring in particular to FIG. 11B, the substrate 38 is depicted with a supporting film and a flexible substrate disposed over (or on) the supporting film. The circuit layer 40 is depicted with a thin film semiconductor layer with sources and gates sandwiched between two buffer layers. The touch layer 44C is disposed between the circuit layer 40 and the display layer 42. The display layer 42 comprises cathode and anode structures and an encapsulation layer disposed over the structures, and the display layer 42 is disposed on the touch layer 44C. Thus, unlike the other panel types 1 and 2, the type 3 flexible touch display panel 24C comprises the touch layer 44C underneath the display layer 42, between the display layer 42 and the circuit layer 40.

According to some embodiments, the display layer in touch display device can include a liquid crystal layer, an organic light emitting diode layer, a quantum dot light emitting diode (QLED), or a micro-LED layer. Therefore, the flexible touch display device can be a LCD display device, an OLED display device, a QLED display device, or a micro-LED display device. For example, the touch display devices in FIG. 9A to 11B can be shown as OLED display devices or QLED display devices, but this invention is not limited to such devices.

Figure 12A:
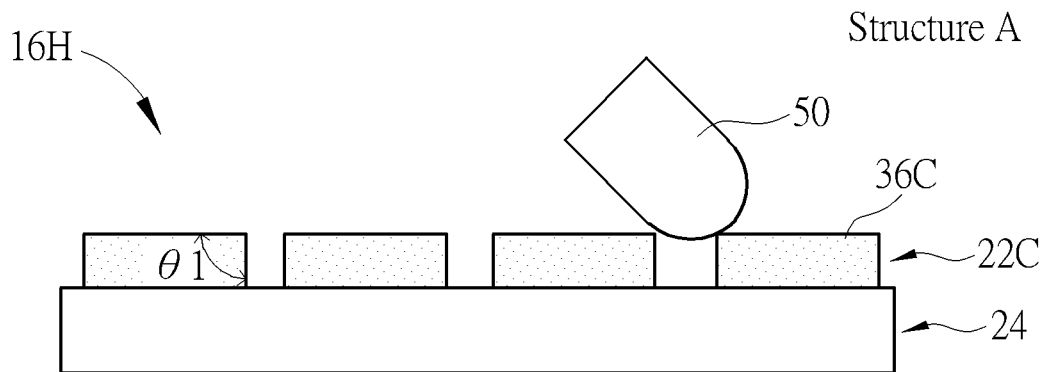
FIGS. 12A-12C are schematic diagrams that illustrate, in cross-sectional view, example cover window layer patterns of units of different shapes and differences in cracking risk.

FIGS. 12A-23B are schematic diagrams that are used to illustrate some fine-tuning of the structure of certain embodiments of a flexible touch display device to improve resistance to cracking and robustness during bending stresses. For instance, FIGS. 12A-14 help to illustrate some considerations for the design of a suitable unit shape for a cover window layer to improve resistance to cracking. Referring in particular to FIG. 12A, shown, in cross-sectional view, is a flexible touch display device 16H comprising an example cover window layer 22C disposed over a touch display panel 24. The cover window layer 22C comprises a completely etched pattern of rectangular-shaped units 36C. Each unit 36C comprises an interior angle formed by the top surface and side surface of θ1, where θ1=90 degrees±5 degrees. A representation 50 of a touch object (e.g., pencil head) is depicted making contact with an edge of one of the units 36C. The entirety of the structure in FIG. 12A of the flexible touch display device 16H is also referred to as structure A.

Figure 12B:
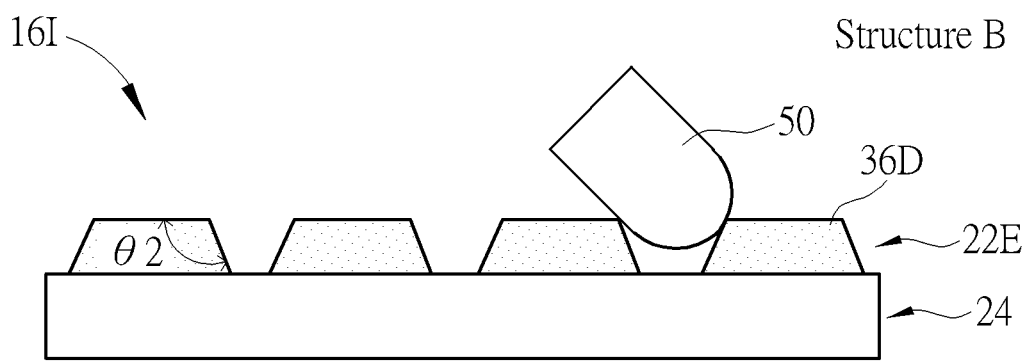

In FIG. 12B, a similar arrangement for a flexible touch display device 16I having a completely etched, patterned cover window layer 22E is shown, also disposed over a touch display panel 24. The units 36D comprising the cover window layer 22E are frustum-shaped. Each unit 36D comprises an interior angle formed by the top surface and side surface of θ2, where θ2=120 degrees±5 degrees. A representation 50 of a touch object (e.g., pencil head) is depicted making contact with an edge of one of the units 36D. The entirety of the structure in FIG. 12B of the flexible touch display device 16I is also referred to as structure B.

Figure 12C:
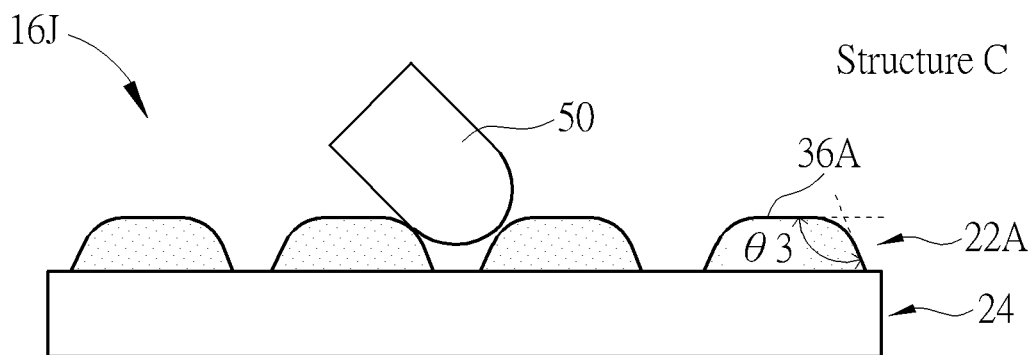

In FIG. 12C, shown is a similar arrangement of a flexible touch display device 16J having a completely etched, patterned cover window layer 22A disposed over a touch display panel 24. The units 36A comprising the cover window layer 22A are curved (e.g., oblong shaped), with a somewhat flat top surface that curves downwards to the surface of the touch display panel 24. Each unit 36A comprises an interior angle formed by the top surface and side surface of θ3, where θ3=120 degrees±5 degrees. A representation 50 of a touch object (e.g., pencil head) is depicted making contact with a curved edge of one of the units 36A. The entirety of the structure in FIG. 12C of the flexible touch display device 16J is also referred to as structure C.

Figure 13:
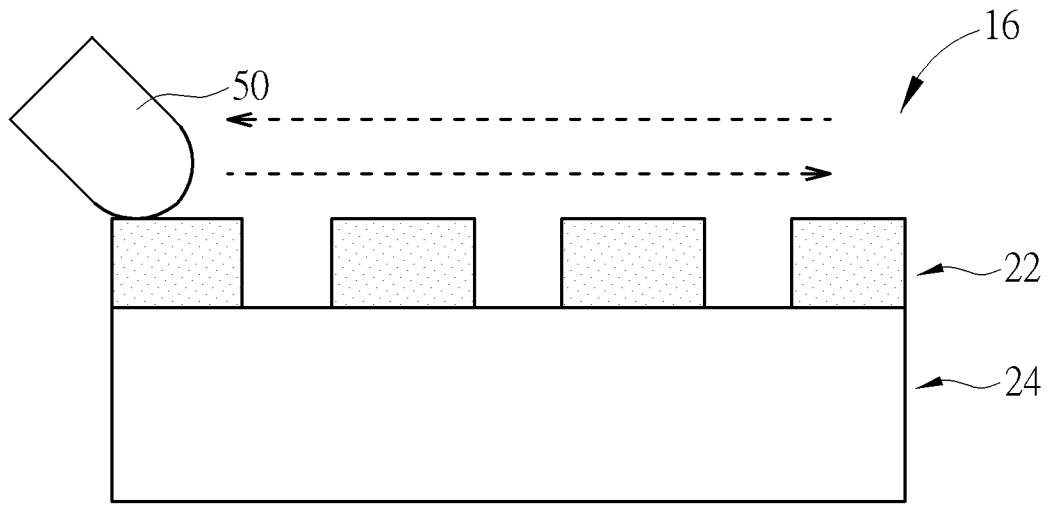
FIGS. 13 and 14 are schematic diagrams that illustrate an experimental arrangement and a graph of probability of cracks found from the experimental arrangement for the example cover window layer patterns of FIGS. 12A-12C.
Figure 14:
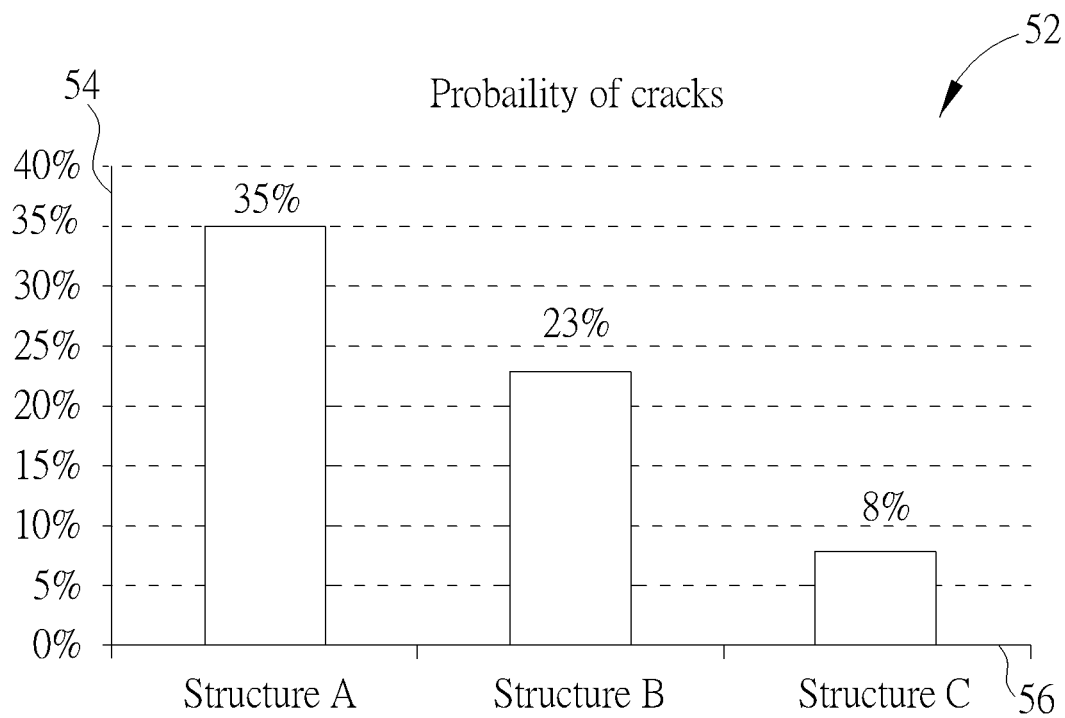

The structures A-C each comprise cover window layers 22 with units 36 configured as protrusions of the same material and size, with the structures A and B having unit configurations that are of an angular shape and structure C having a unit configuration that is of a curved shape. With continued reference to FIGS. 12A-12C, attention is directed to FIGS. 13 and 14, where an experimental arrangement is depicted (FIG. 13) and the results of the experiment involving structures A-C are graphed (FIG. 14). With regard to FIG. 13, shown is a flexible touch display device 16 comprising a cover window layer 22 (e.g., patterned and completely etched) disposed over the touch display panel 24, and the object 50 (pencil) depicted as moving linearly to the left and the right to rub the cover window layer 22 one thousand times (1000×) for each of the structures A-C. The rubbing can be performed at a rate of 3 mm/sec under a load of 1.0 kg according to JISK5400, and the rubbing distance can be 50 mm long.

The result is depicted in FIG. 14, which comprises a bar graph 52 having on the vertical axis 54 the probability of cracks, and on the horizontal axis 56, the structures A, B, and C. The results indicate that the probability of cracks based on the experiment shown in FIG. 13 are 35%, 23%, and 8% for structure A, structure B, and structure C, respectively. In other words, structures B and C, with a θ2 and θ3=120 degrees±5 degrees, perform better than structure A, with a θ1=90 degrees±5 degrees. Even further, structure C, with its curved shape and θ3=120 degrees±5 degrees, performs better than the angled-unit, cover window layers for structures A and B. In other words, the cover window layer 22A of structure C, with its curved unit configuration (36A) and θ3=120 degrees±5 degrees, reduces the cracking risk when compared to the other structures A and B having the cover window layers 22C and 22E.

Figure 15A:
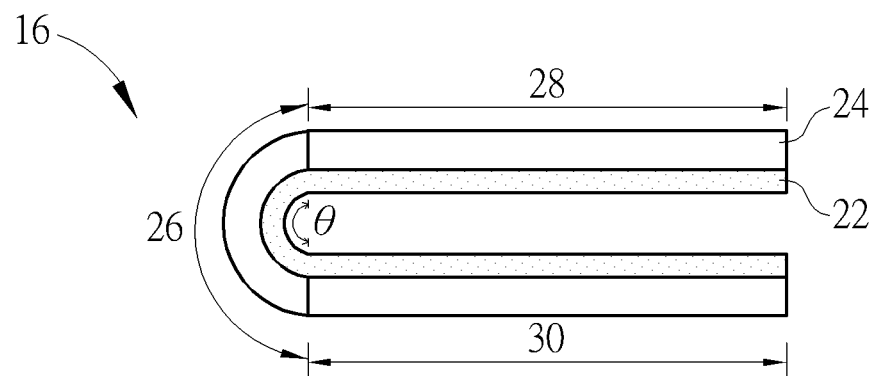
FIGS. 15A-15C are schematic diagrams that illustrate example size differences between regions of an embodiment of a flexible touch display device.
Figure 15B:
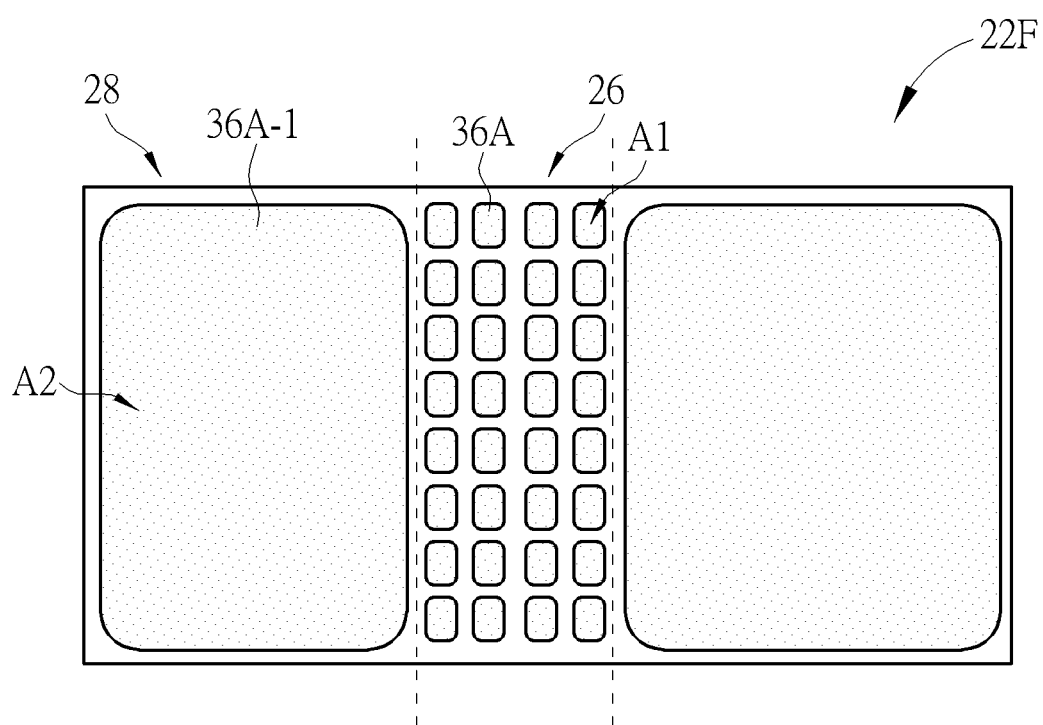
Figure 15C:
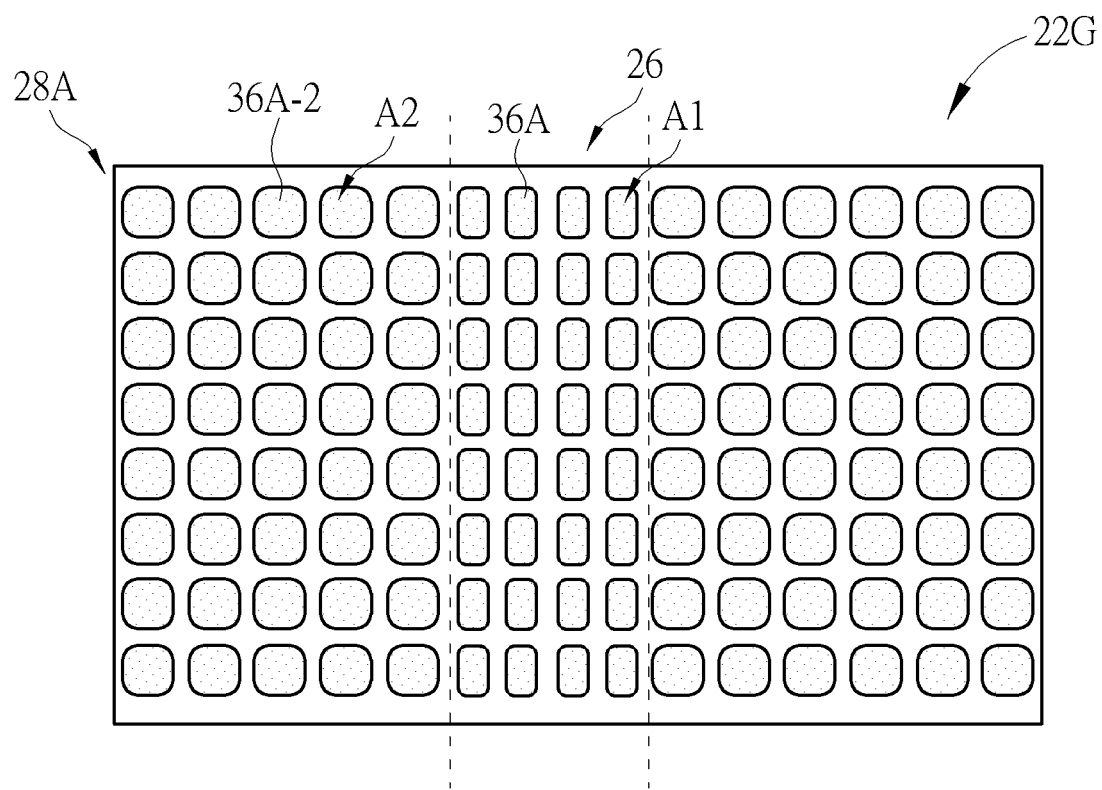

Referring now to FIGS. 15A-15C, shown are yet other parameters to fine tune to reduce stresses on the cover window layer. In particular, FIGS. 15A-15C illustrate example size differences between regions of an embodiment of a flexible touch display device. In FIG. 15A, shown is an embodiment of a flexible touch display device 16 comprising a touch display panel 24 having a patterned (though depicted as contiguous for simplicity of illustration) cover window layer 22 disposed over the panel 24. The flexible touch display device 16 is shown in FIG. 15A folded over (e.g., +180 degrees), revealing a foldable region 26 and a flat region 28 (and flat region 30). With continued reference to FIG. 15A, and focusing now on FIG. 15B, shown is one embodiment of a cover window layer 22F in top plan view, with the foldable region 26 adjacent the flat region 28. The foldable region 26 comprises plural units 36A arranged in an array or matrix, each unit 36A having an area equal to A. The flat region 28 comprises a single unit 36A-1 with an area of A2. In one embodiment, A1<A2. Referring to FIG. 15C, shown is an embodiment of a cover window layer 22G with the foldable region 26 and the adjacent flat region 28A. In this depicted embodiment, the cover window layer 22G comprises an array or matrix of the units 36A (in the foldable region 26), each unit 36A having an area, A1. The cover window layer 22G comprises an array or matrix of the units 36A-2 in the adjacent flat region 28A (on either side of the foldable region, but focusing on the left hand side of the foldable region), with each unit 36A-2 having an area A2. In one embodiment, A2>A1. By configuring the foldable region 26 to have units 36A, each of a smaller area (A1) than the area of the unit 36A-1 or 36A-2 of the flat region 28 (or 28A), the folding stresses on the cover window layer 22 (e.g., 22F, 22G) are reduced. In one embodiment, each unit 36A in the foldable region 26 has an area that is greater than 10 $\mu m^2$ but less than 800 $\mu m^2$. Variations in the size range may be used in some embodiments.

Figure 16A:
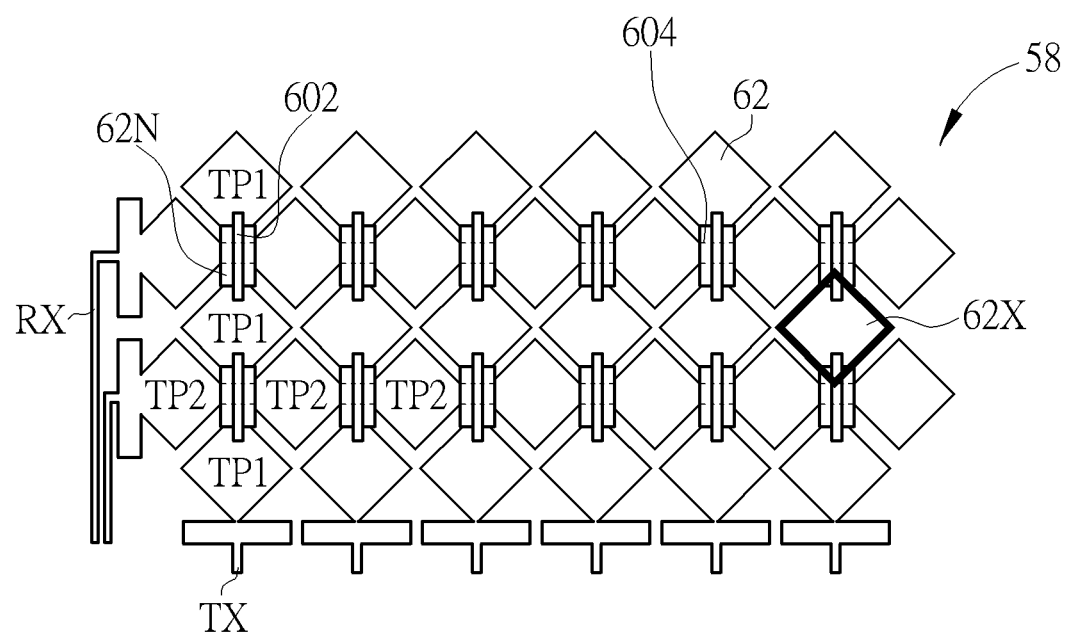
FIGS. 16A-16B are schematic diagrams that illustrate touch electrode and touch mesh type touch regions in a foldable region for an embodiment of a flexible touch display device.

As evident from the description above, various parameters of the cover window layer in the foldable region may be adjusted to control stress during bending or folding. However, the touch layer of the foldable region also has parameters that may be adjusted to reduce stress during bending and folding. In some embodiments, adjustments to parameters of both the cover window layer and the touch layer are adjusted to improve stress reduction performance. As mentioned above, the touch layers 44 shown in FIGS. 9A-11B are patterned. For example, the touch layer 44 can be a touch electrode type structure 58 as shown in FIG. 16A. Alternatively, the touch layer 44 can be a touch mesh type structure 60 as shown in FIG. 16B.

In some embodiments, referring to FIG. 16A, the touch electrode type structure 58 can include plurality of touch units 62 to form a plurality of driving electrodes Tx and a plurality of sensing electrodes Rx. The touch units 62 shown in FIG. 16A is in rhombic shape, for example only. The touch units 62 can be in other shape, and the shape is not limited. The driving electrodes Tx can be arranged along a column direction, and the sensing electrodes Rx can be arranged along a row direction. Each column of driving electrode Tx include a plurality of touch units 62 labeled as TP1, and two adjacent touch units TP1 can be connected by a connecting part 602. Each row of sensing electrode Rx include a plurality of touch units 62 labeled as TP2, and two adjacent touch units TP2 can be connected by a connecting part 604 (shown by a dashed line). The connecting part 602 and the connecting part 604 are insulated by an insulating part 62N. In one example operation, the first touch unit (electrode) TP1 and the second touch unit (electrode) TP2 may perform a mutual capacitive touch sensing function. The material for the touch unit 62 can be transparent conductive material. For example, one common material for the touch unit 62 is ITO (indium tin oxide), though other material may be used as is known. An area of the touch unit 62 is shown encompassed by the thick line around the perimeter of the unit 62X.

Figure 16B:
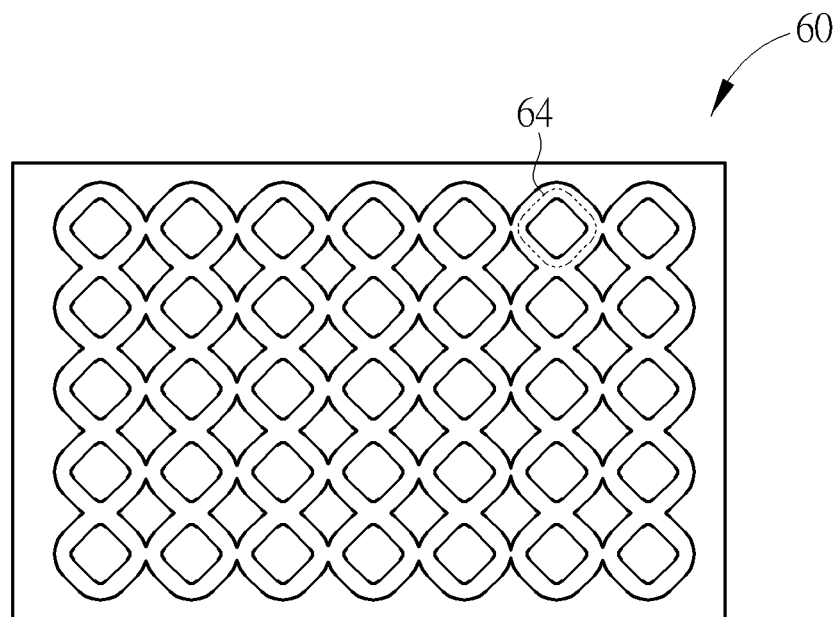

In FIG. 16B, the touch mesh type structure 60 uses a conceptually similar operation to that described above for the touch electrode type structure 58, but is configured with an array or matrix of touch units 64 each formed as a metal mesh electrode. Referring FIGS. 16B, 23C, and 23D together, the touch mesh type structure 60 is formed by the mesh material 60M and plural openings are formed in the mesh material 60M. In FIG. 23C, two adjacent touch units 64-1 and 64-2 are labeled, and two openings 641 and 645 are formed in the touch units 64-1 and 64-2 respectively. Referring to FIG. 23D, the touch unit 64-1 is defined by the dashed line L running centrally between the outer and interior boundary of the mesh material. In other words, referring to FIGS. 23C and 23D, the boundary between two adjacent touch units 64-1 and 64-2 is in the middle of the mesh material between the two touch units 64-1 and 64-2.

Specifically, the dashed line L is defined as the boundary of one touch unit 64-1. The mesh material within the boundary L in the touch unit 64-1 is defined as the touch enclosing part 642 (depicted in shadow area). The touch unit 64-1 includes the opening 641 and the touch enclosing part 642 enclosing the opening 641, and the touch unit 64-2 includes the opening 645 and the touch enclosing part 646 enclosing the opening 645. In some portion, the enclosing part 642 of the touch unit 64-1 and the enclosing part 646 of the touch unit 64-2 are continuously connected. The area of the touch unit 64-1 is sum of the area of the opening 641 and the area of the touch enclosing part 642. The width of the touch enclosing part 642 is labeled as W3.

The material for the touch unit 64 can be metal. Common material for the touch unit 64 includes Ti, Al, Ti/Al/Ti among other materials as is known. In general, the touch units 62 and 64 sense touch activity of a user, and may perform a mutual-capacitive touch sensing function, a self-capacitive touch sensing function, or similar.

Figure 17A:
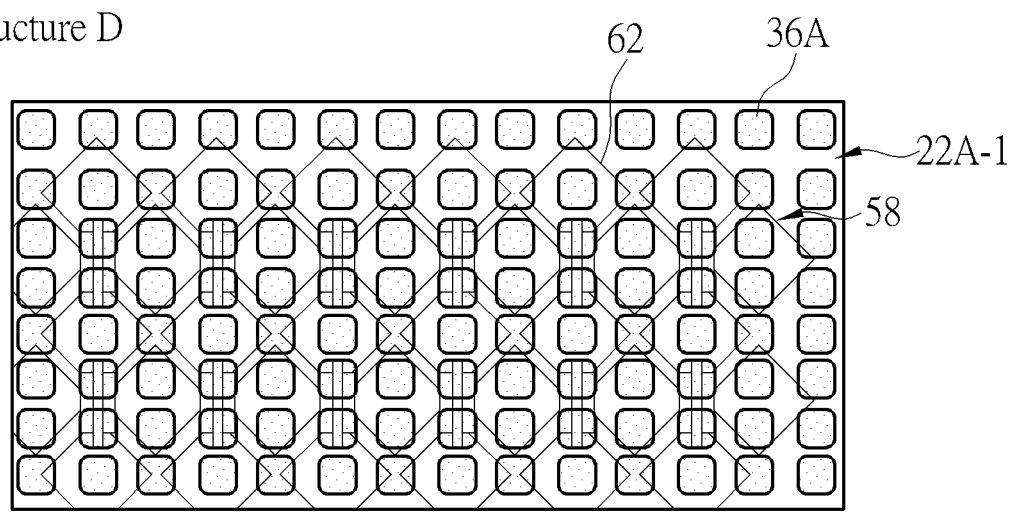
FIGS. 17A-17B are schematic diagrams that illustrate example structures for touch electrode type units and cover window layer units in a foldable region for selection for an embodiment of a flexible touch display device.
Figure 17B:
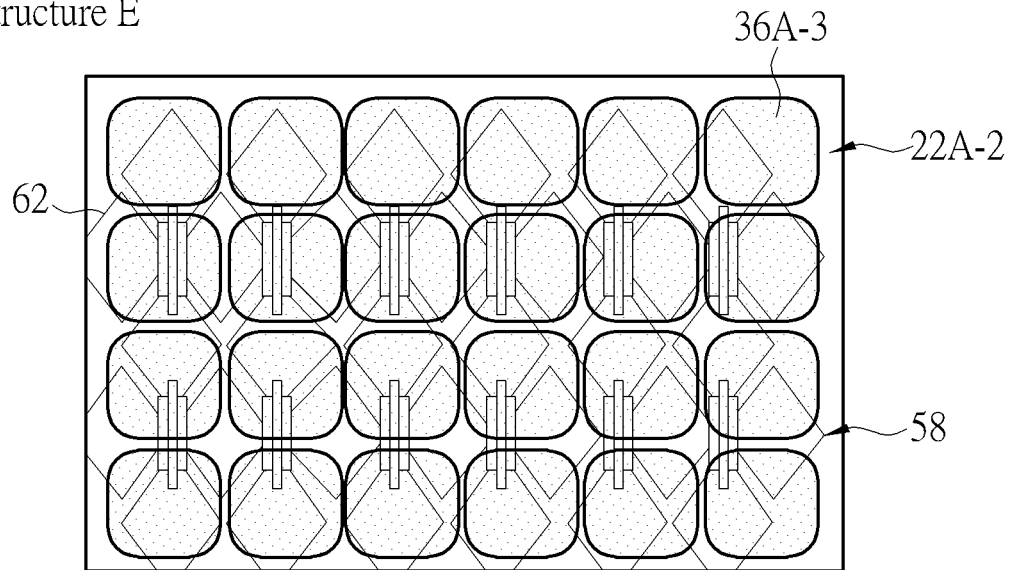

The touch unit size and the cover window layer size may be adjusted to achieve an optimal relative size between the two layers. To further illustrate this point, attention is first directed to FIGS. 17A-17B, which illustrate example structures for touch electrode type units and cover window layer units in a foldable region for selection for an embodiment of a flexible touch display panel. Referring to FIG. 17A, shown is a patterned cover window layer 22A-1 (similar to pattern cover window layer 22A, FIG. 5A) disposed over a touch layer 58, the cover window layer 22A-1 comprising an array or matrix of units 36A in the foldable region and the touch layer 58 comprising an array or matrix of touch (touch electrode type) units 62 in the foldable region. As depicted in FIG. 17A, the touch unit area is greater than the cover window layer unit area. The structure in FIG. 17A is denoted, structure D. Referring to FIG. 17B, shown is a patterned cover window layer 22A-2 (similar to 22A-1 except larger units 36A-3) disposed over a touch layer 58, the cover window layer 22A-2 comprising an array or matrix of units 36A-3 in the foldable region and the touch layer 58 comprising an array or matrix of touch (touch electrode type) units 62 in the foldable region. As depicted in FIG. 17B, the touch unit area is less than the cover window layer unit area. The structure in FIG. 17B is denoted, structure E.

Figure 18A:
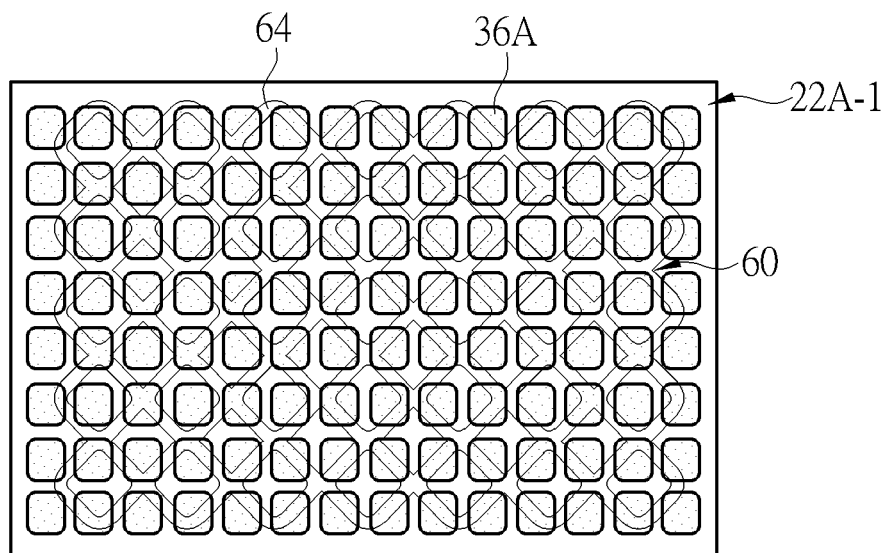
FIGS. 18A-18B are schematic diagrams that illustrate example structures for a touch mesh type units and cover window layer units in a foldable region for selection for an embodiment of a flexible touch display device.
Figure 18B:
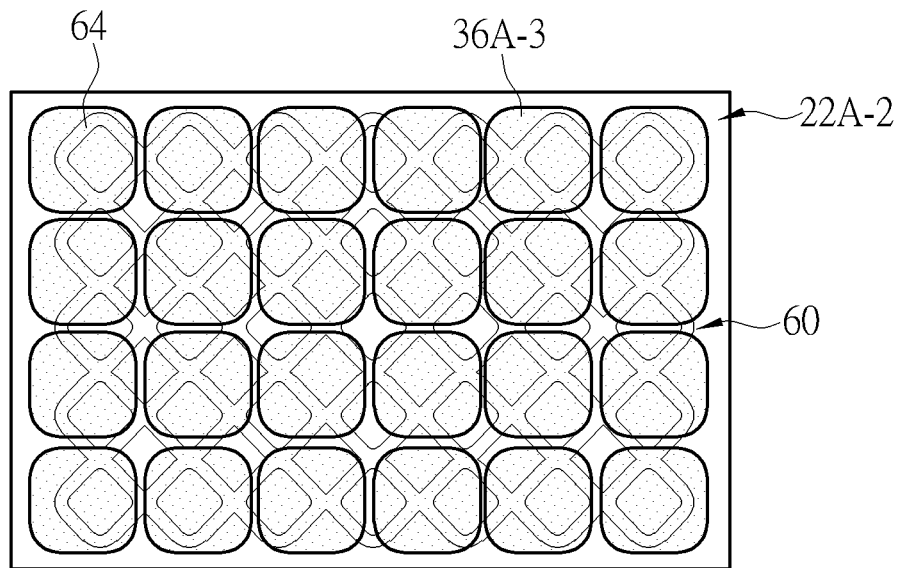

Turning now to FIGS. 18A-18B, shown are schematic diagrams that illustrate example structures for touch mesh type units and cover window layer units in a foldable region for selection for an embodiment of a flexible touch display panel. Referring to FIG. 18A, shown is a patterned cover window layer 22A-1 disposed over a touch layer 60, the cover window layer 22A-1 comprising an array or matrix of units 36A in the foldable region and the touch layer 60 comprising an array or matrix of touch (touch mesh type) units 64 in the foldable region. As depicted in FIG. 18A, the touch unit area is greater than the cover window layer unit area. The structure in FIG. 18A is denoted, structure F. Referring to FIG. 18B, shown is a patterned cover window layer 22A-2 disposed over a touch layer 60, the cover window layer 22A-2 comprising an array or matrix of units 36A-3 in the foldable region and the touch layer 60 comprising an array or matrix of touch (touch mesh type) units 64 in the foldable region. As depicted in FIG. 18B, the touch unit area is less than the cover window layer unit area. The structure in FIG. 18B is denoted, structure G.

Figure 19A:
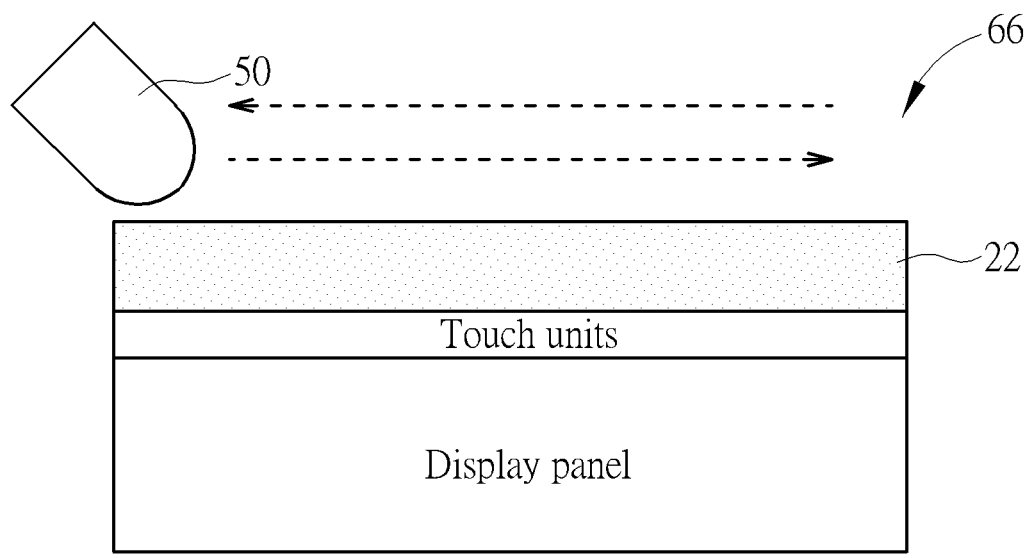
FIGS. 19A-19B are schematic diagrams that illustrate an example reliability experimental arrangement for evaluating probability of damage for the example structures of FIGS. 17A-18B.
Figure 19B:
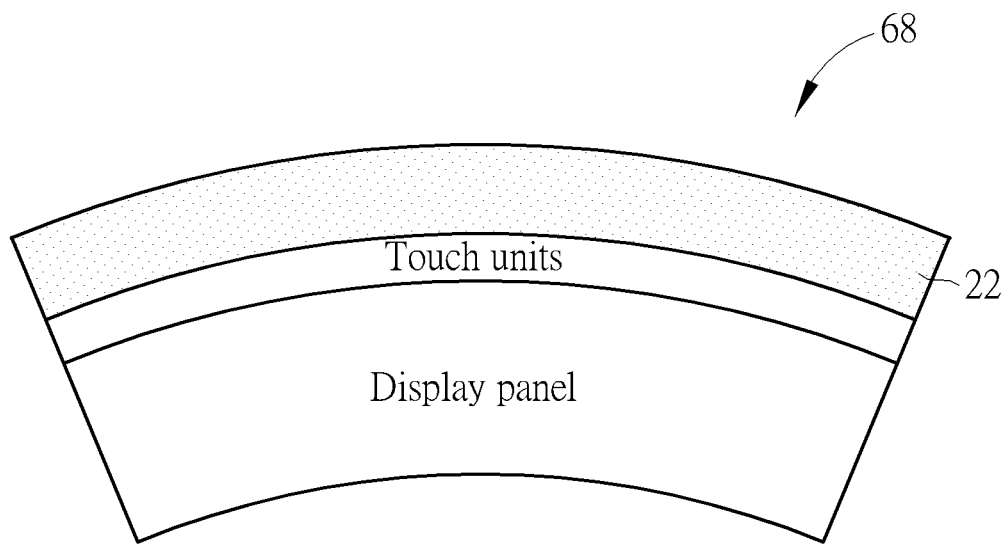
Figure 20:
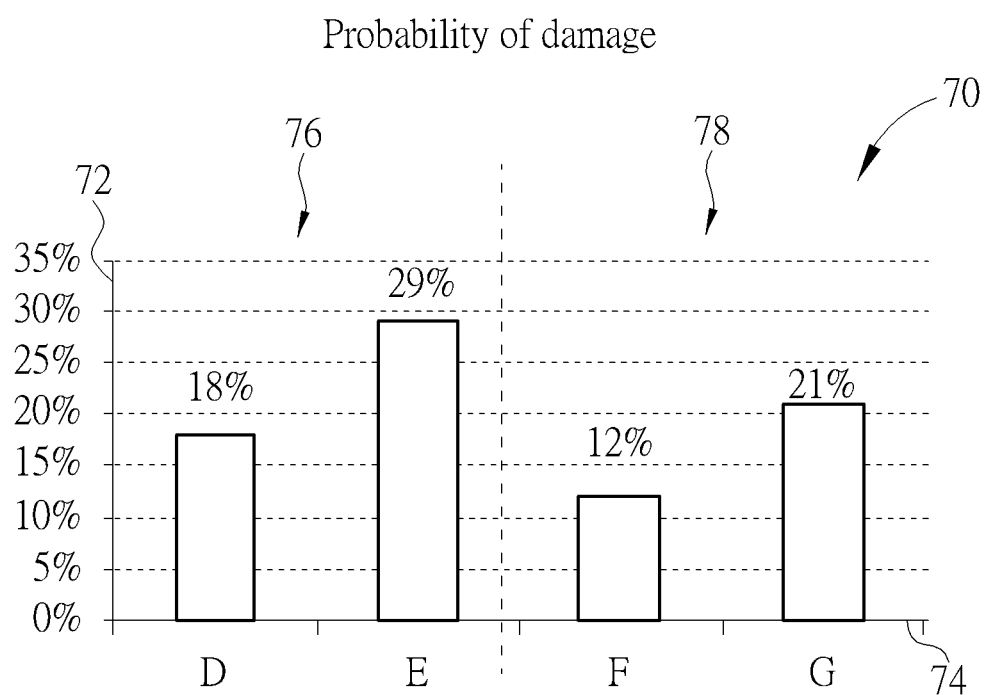
FIG. 20 is a schematic diagram that illustrates the probability of damage for the example structures of FIGS. 17A-18B.

To determine the reliability of structures D, E, F, and G for evaluating probability of damage, two types of tests are used, as illustrated in FIGS. 19A-19B. In FIG. 19A, shown is a rubbing test 66 wherein a touch object 50 (e.g., pencil) is rubbed back along the patterned (though depicted as contiguous for simplicity in illustration) cover window layer 22 of the structures D-G one thousand times (1000×). The rubbing test is similar to that mentioned in FIG. 13. In FIG. 19B, shown is a folding test 68 wherein the structures D-G are folded one thousand times (1000×). After the rubbing test and folding test are performed, observations of the structures D-G were made with a microscope to facilitate a calculation on the probability of damage. The results are shown in FIG. 20, which illustrates the probability of damage for the example structures D-G In particular, FIG. 20 shows a bar graph 70 that comprises a vertical axis 72 of probability of damage (in percentage) and a horizontal axis 74 with the different structures D-G Two columns of data are shown, including a touch electrode type column 76 for corresponding type structures D and E, and a touch mesh type column 78 for corresponding type structures F and G As shown, the probability of damage is approximately 18% for structure D, 29% for structure E, 12% for structure F, and 21% for structure G In other words, in terms of having a lower probability of damage, structure D is better than structure E and structure F is better than structure leading to the conclusion that for structures (e.g., structures D and F) with the area for each of the cover window layer units less than the area for each of the touch units, the reliability is better. Also, since structures F and G performed better than structures D and E, respectively, the conclusion is that the touch mesh type touch units are better than the touch electrode type units in terms of reliability (for similar relative unit areas).

Figure 21A:
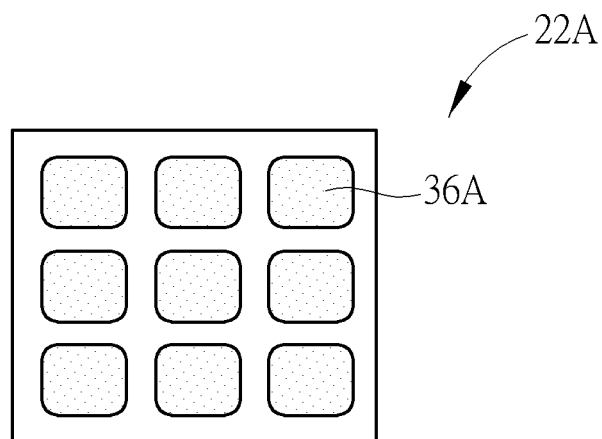
FIGS. 21A-21C are schematic diagrams that illustrate, example relative dimensions for parameters of interest for example cover window layer units for an embodiment of a flexible touch display device.

Referring now to FIGS. 21A-23D, shown are some parameters that illustrate the fine tuning of unit spacing and dimensions for certain embodiments of a flexible touch display device. As described further below, one or more parameters of the cover window layer are adjusted to further control the bending stresses, including the parameters of unit width, unit height, and unit spacing distance. A touch unit size (described below) is also controlled and has an important effect on the stress when certain embodiments of a flexible touch display device undergoes bending or folding, as described further below. Adjustments are made to the parameters of the cover window layer and/or the touch layer of certain embodiments of a flexible touch display device to reduce the probability of damage from bending stresses and/or reduce the probability of cracking. In FIG. 21A, shown in top view is an example cover window layer 22A showing curved units 36A arranged in an array or matrix.

Figure 21B:
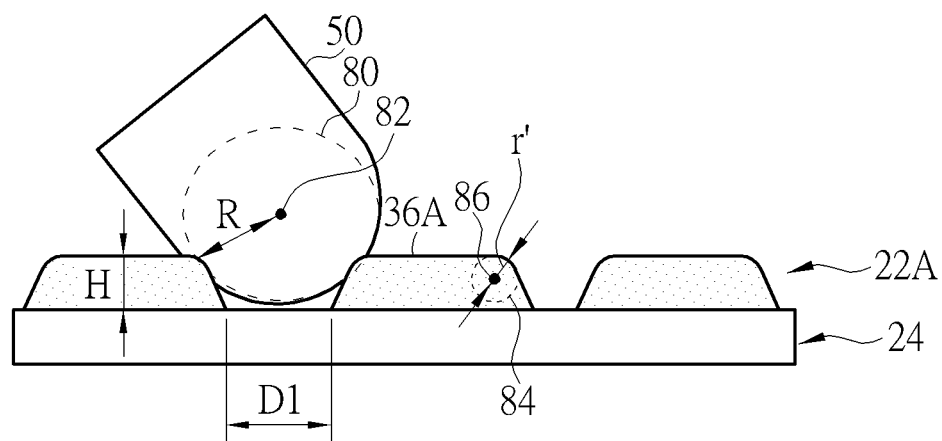

The units 36A are also referred to as main protected portions, and all other space in the cover window layer 22A is referred to as release stress portions. In one embodiment, the main protected portion areas>release stress portion areas. Referring to FIG. 21B, shown is the cover window layer 22A (completely etched and patterned) in cross sectional view, the cover window layer 22A disposed on a touch display panel 24. The touch object 50 is depicted in FIG. 21B disposed between two of the units 36A of the cover window layer 22A, touching the curved edges of the two units 36A. Several parameters of interest are illustrated. Within the touch object 50, a circular graphic 80 is shown superimposed on the curved end of the touch object 50, the circular graphic 80 comprising a center 82 and a radius (R) extending to the curved edge of the unit 36A. Similarly, depicted in the centrally-located unit 36A of FIG. 21B and adjacent one of the curved edges of the unit 36A is a circular graphic 84 having a center 86 and a radius (r') to the curved edge of the unit 36A. At the unit 36A on the left hand side in FIG. 21B, shown is a height or thickness (H) parameter corresponding to the distance between the top surface of the touch display panel 24 and the top surface of the unit 36A. Also shown in between the left hand and central units 36A is a unit (or pattern) spacing distance, D1, between the points of the units 36A adjacent the touch display panel top surface. Stated otherwise, a curvature radius of a tip of the touch object 50 (e.g., touch pen, finger, etc.) for touching a surface of the cover window layer 22A may be R, a thickness of each of the units 36A may be H, and a maximum gap between adjacent ones of the units 36A may be D1, satisfying the following equation:

$$D1^2 < 4H(H-2R), \quad \text{(Eqn. 1)}$$

If Rmin approaches 0, the unit spacing distance, D1max approaches 2H. Upon collisions and friction being imposed between the touch object 50 and the units 36A of the cover window layer 22A, the curved shape type units 36A reduce the cracking risk of the cover window layer 22A.

Figure 21C:
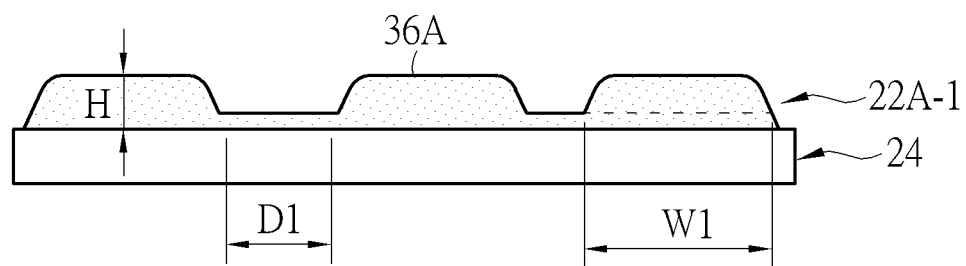

FIG. 21C shows a variation of the cover window layer 22A, denoted in FIG. 21C as 22A-1, where the curved units 36A are separated by the cover window layer areas remaining from a partial etch. Shown are similar parameters of unit thickness (H) between the top surface of the unit 36A and the top surface of the touch display panel 24, a spacing distance or gap D1 between adjacent units 36A, and a unit width, W1, the dimensions D1 and W referenced from the top surface of the remaining cover window layer material disposed directly on the touch display panel 24. It is noted that the units 36A are also referred to as main protected portions, and the space (remaining from the partial etch) between the units 36A referred to as release stress portions. Also, D1<W1 (for both structures shown in FIGS. 21B and 21C).

Figure 22A:
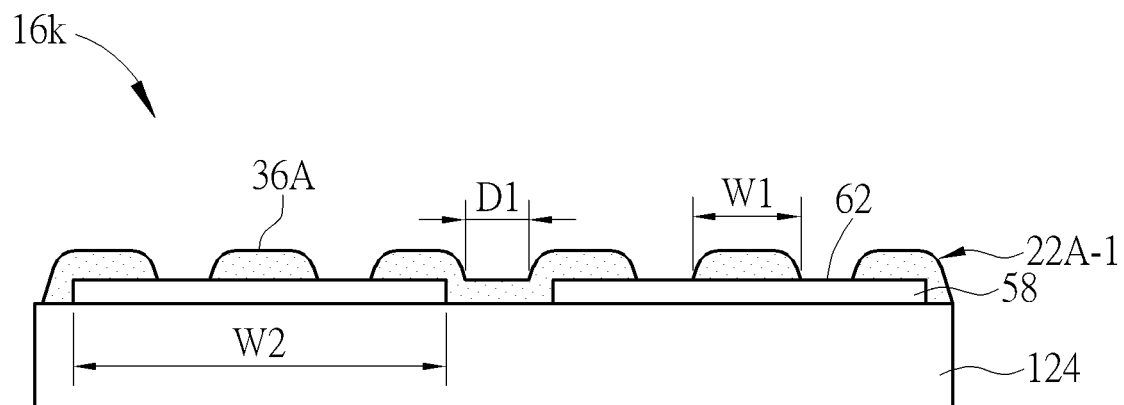
FIGS. 22A-22B are schematic diagrams that illustrate example relative dimensions for parameters of interest for example cover window layer units and touch electrode type touch units for an embodiment of a flexible touch display device.
Figure 22B:
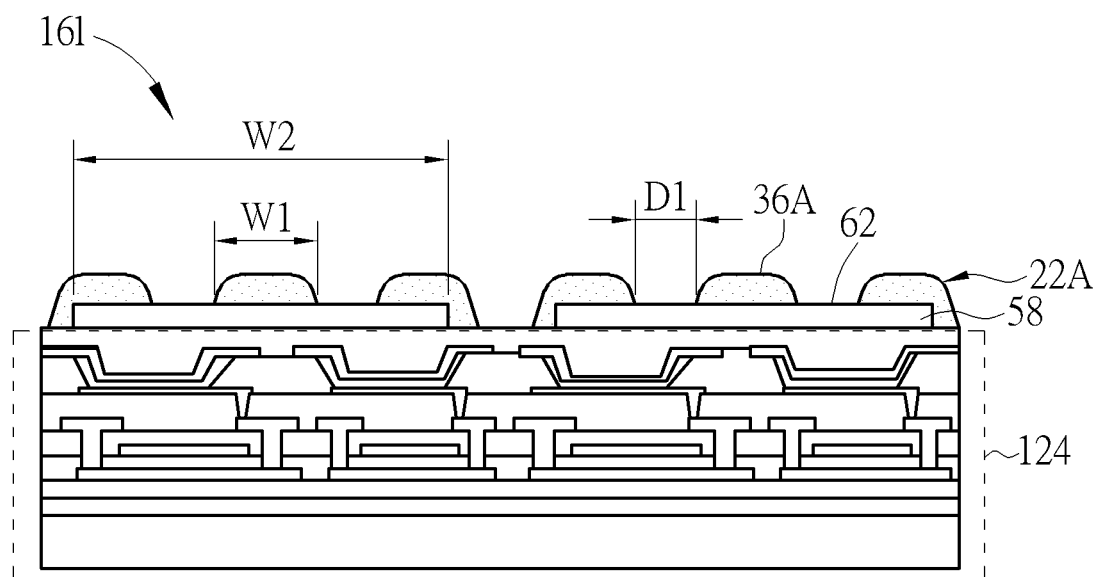

Applying the above-described parameter constraints to particular flexible touch display device structures, reference is made to FIGS. 22A-22B (for structure D described in association with FIG. 17A) and FIGS. 23A-23D (for structure F described in association with FIG. 18A). For instance, and referring to FIGS. 22A-22B, shown are the parameter constraints (described in association with FIGS. 21A-21C) for a flexible touch display device 16k corresponding to structure D. Referring to FIG. 22A, shown is a flexible touch display device 16k comprising a patterned (partially etched) cover window layer 22A-1 disposed over a touch layer 58, which in turn is disposed over a display panel 124. The display panel 124 can include the substrate 38, the circuit layer 40 and the display layer 42, as described and depicted in FIGS. 9A to 11B. The cover window layer 22A-1 comprises plural cover window layer units 36A. The touch layer 58 comprises plural touch electrode type touch units 62. Parameters of interest include the width (W1) of each of the cover window layer units 36A, the spacing (D1) or gap between the base of adjacent cover window layer units 36A, and the width (W2) of each of the touch electrode type touch units 62. In one embodiment, D1<W1<W2. Referring to FIG. 22B, shown is a flexible touch display device 16I comprising a patterned (fully etched) cover window layer 22A disposed over a touch layer 58, which in turn is disposed over a display panel 124, that in FIG. 22B is shown expanded with the structures similar to that shown in the type 1 display panel of FIG. 9B. The cover window layer 22A comprises plural cover window layer units 36A. The touch layer 58 comprises plural touch electrode type touch units 62. Parameters of interest include the width (W1) of each of the cover window layer units 36A, the spacing (D1) or gap between the base of adjacent cover window layer units 36A, and the width (W2) of each of the touch electrode type touch units 62. In one embodiment, D1<W1<W2.

Figure 23A:
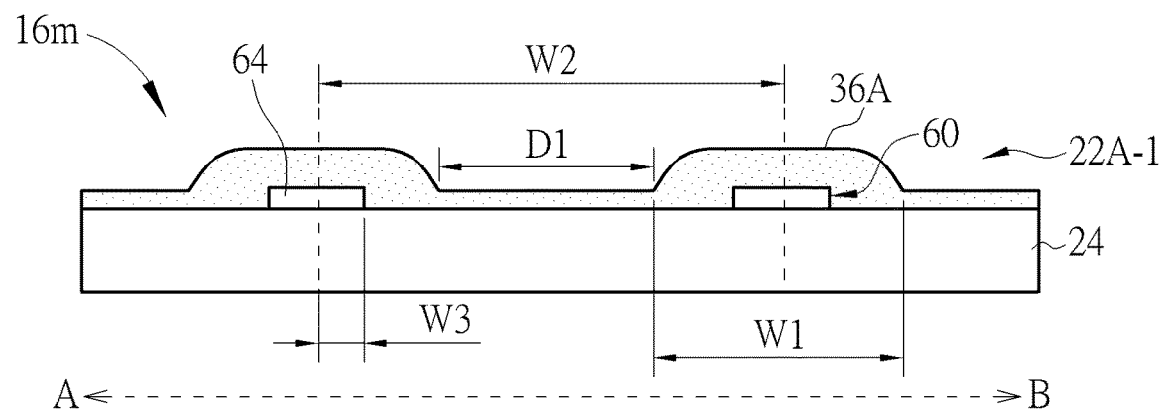
FIGS. 23A-23D are schematic diagrams that illustrate example relative dimensions for parameters of interest for example cover window layer units and touch mesh type touch units for an embodiment of a flexible touch display device.
Figure 23B:
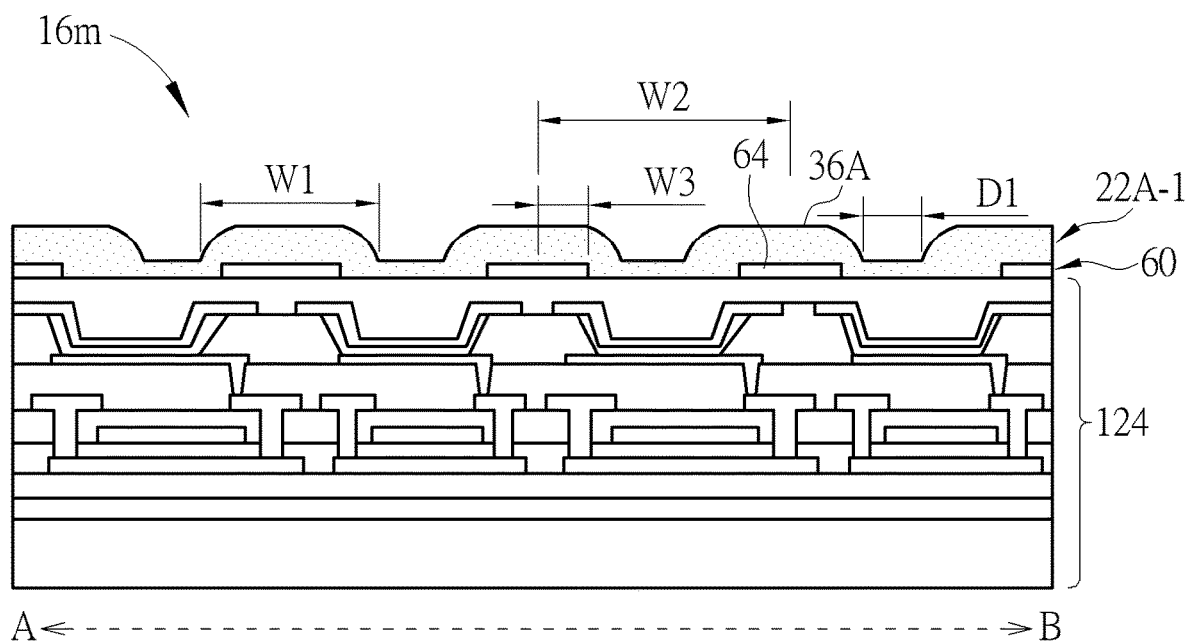
Figure 23C:
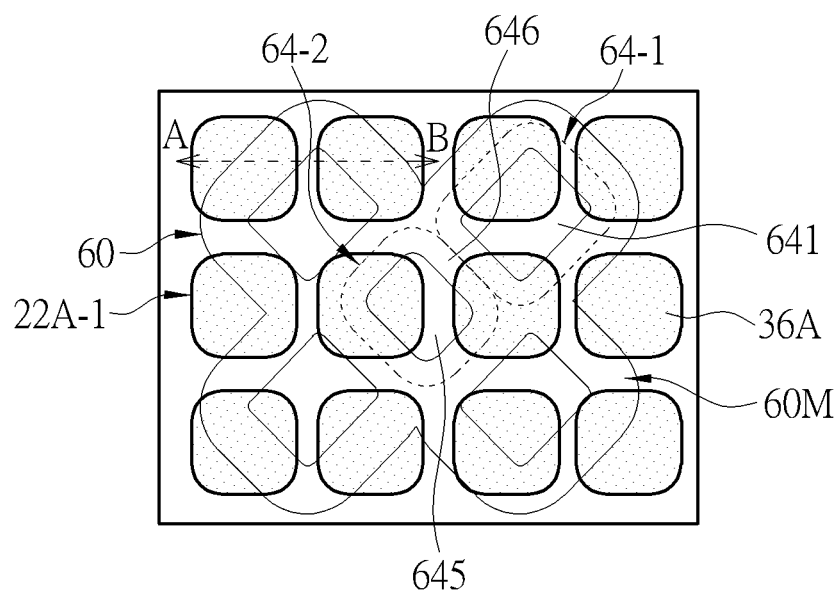
Figure 23D:
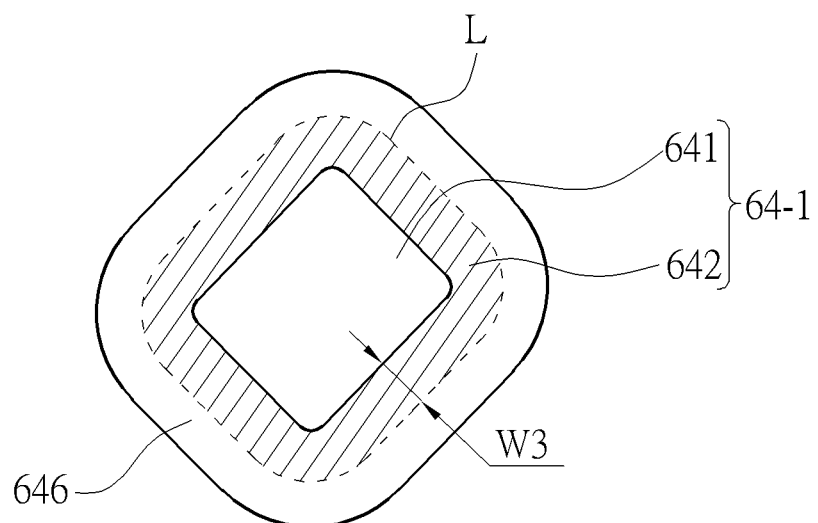

FIGS. 23A-23D are schematic diagrams that illustrate example relative dimensions for parameters of interest for example cover window layer units and touch mesh type touch units for an embodiment of a flexible touch display device. For instance, and referring to FIGS. 23A-23D, shown are the parameter constraints (described in association with FIGS. 21A-21C) for a flexible touch display device 16m corresponding to structure F. In particular, FIGS. 23A-23D illustrate some relative dimensions for parameters of interest for structure F illustrated in FIG. 18A. Referring to FIG. 23A, shown is a flexible touch display device 16m comprising a patterned (partially etched) cover window layer 22A-1 disposed over a touch layer 60, which in turn is disposed over a display panel 124. The cover window layer 22A-1 comprises plural cover window layer units 36A. The touch layer 60 comprises plural touch mesh type touch units 64. Parameters of interest include the width (W1) of each of the cover window layer units 36A, the spacing (D1) or gap between the base of adjacent cover window layer units 36A, the width (W2) between the centers of the touch mesh type touch units 64, and a touch enclosing part width (W3), explained below. FIG. 23B illustrates a flexible touch display device 16m corresponding to structure F, yet with the display panel 24 expanded, the flexible touch display device 16m of FIG. 23B comprising the same parameters of interest expressed above for FIG. 23A and omitted here for brevity. In FIG. 23C, shown a top view of plural touch mesh type touch units 64 of the touch layer 60, upon which is disposed the cover window layer 22A-1 with the plural cover window layer units 36A. Of particular relevance, and referring also to FIG. 23D, the touch mesh type touch unit 64-1 is characterized with an opening 641 and a touch enclosing part 642 bounded by the dashed line L. The touch enclosing part width (W3) is shown as the dimension between an interior of one of the units 64 and the dashed line L. In one embodiment, D1<W3<W1.

Figure 24A:
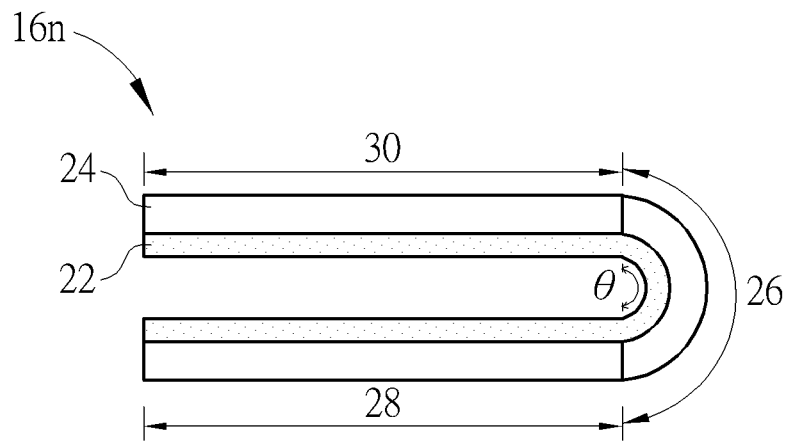
FIGS. 24A-26B are schematic diagrams that illustrate example area combinations for a foldable region for an embodiment of a flexible touch display device.
Figure 24B:
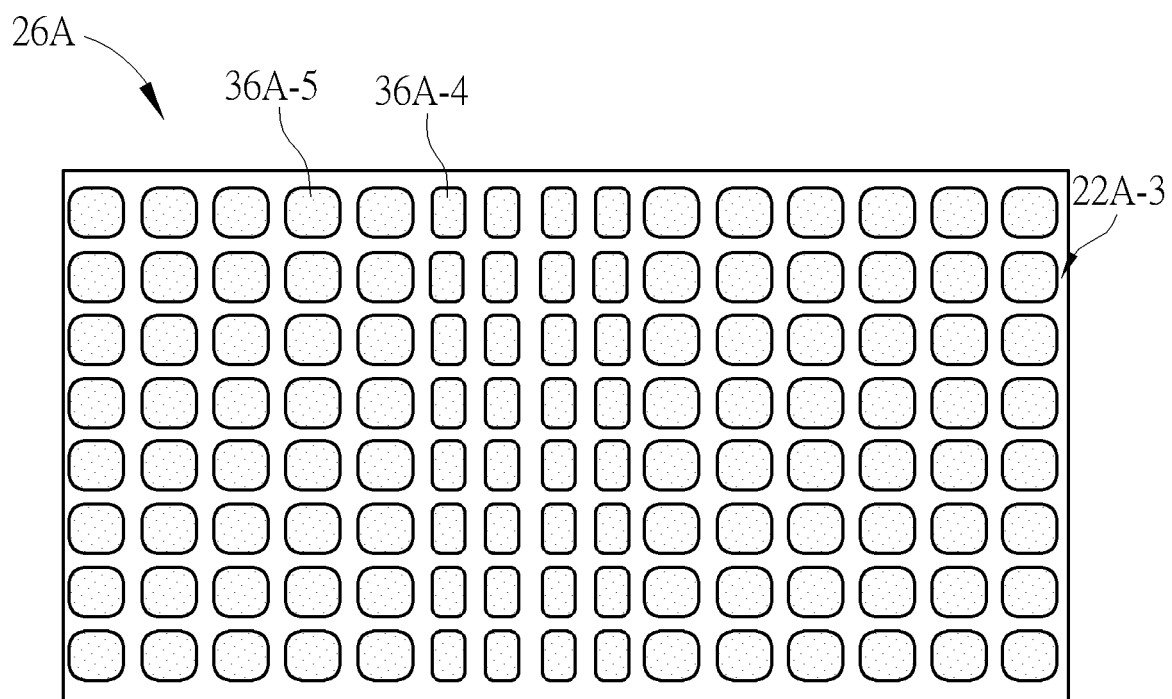

FIGS. 24A-26B are schematic diagrams that illustrate example area combinations for a foldable region for an embodiment of a flexible touch display device. Referring to FIG. 24A, shown is a flexible touch display device 16n comprising a foldable region 26 disposed between two flat regions 28, 30. The flexible touch display device 16n comprises a cover window layer 22 disposed over a touch display panel 24. The flat region 30 is shown folded over the flat region 28, the folding enabled by the foldable region 26. In FIG. 24B, shown is a top plan view of the foldable region 26A, which illustrates the patterned cover window layer 22A-3 having an array or matrix of cover window layer units 36A-4, 36A-5. In the depicted embodiment, the area of each of the units 36A-5 is greater than each of the units 36A-4, the units 36A-4 localized more centrally to the foldable region 26A.

Figure 25A:
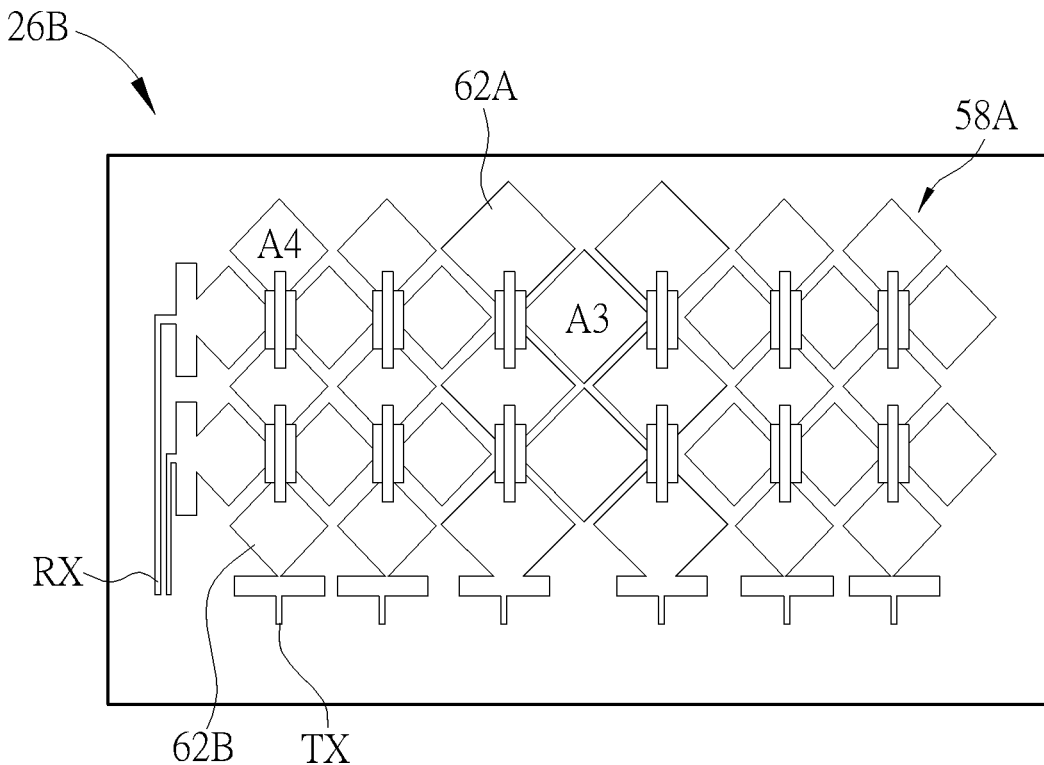
Figure 25B:
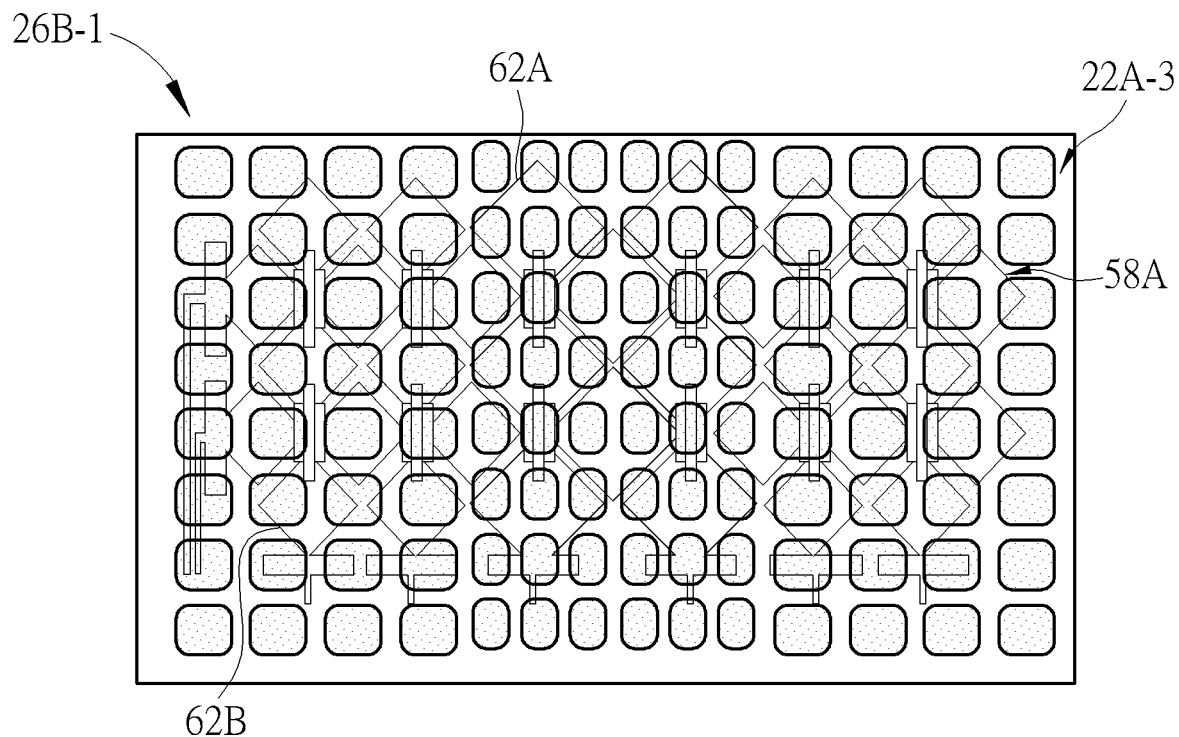

FIGS. 25A and 25B illustrate foldable regions 26B and 26B-1 for a touch layer 58A of the touch display panel 24, respectively. The touch layer 58A comprises an array or matrix of touch electrode type touch units 62A and 62B. The touch units 62A, located more centrally to the foldable region 26B, include the designation A3 representing their respective touch units areas, and the touch units 62B include the designation A4 representing their respective touch unit areas. In one embodiment, the areas A3 and A4 are different within the foldable region 26B, wherein A4 is less than A3. FIG. 25B illustrates the foldable region 26B-1 with the cover window layer 22A-3 disposed over the touch layer 58A of FIG. 25A, where the minimum touch unit area (A4) is greater than the maximum cover window unit area (e.g., 36A-5 of FIG. 24B). Note that there is overlap between the cover window layer units 36A-4 and the touch units 62A (A3).

Figure 26A:
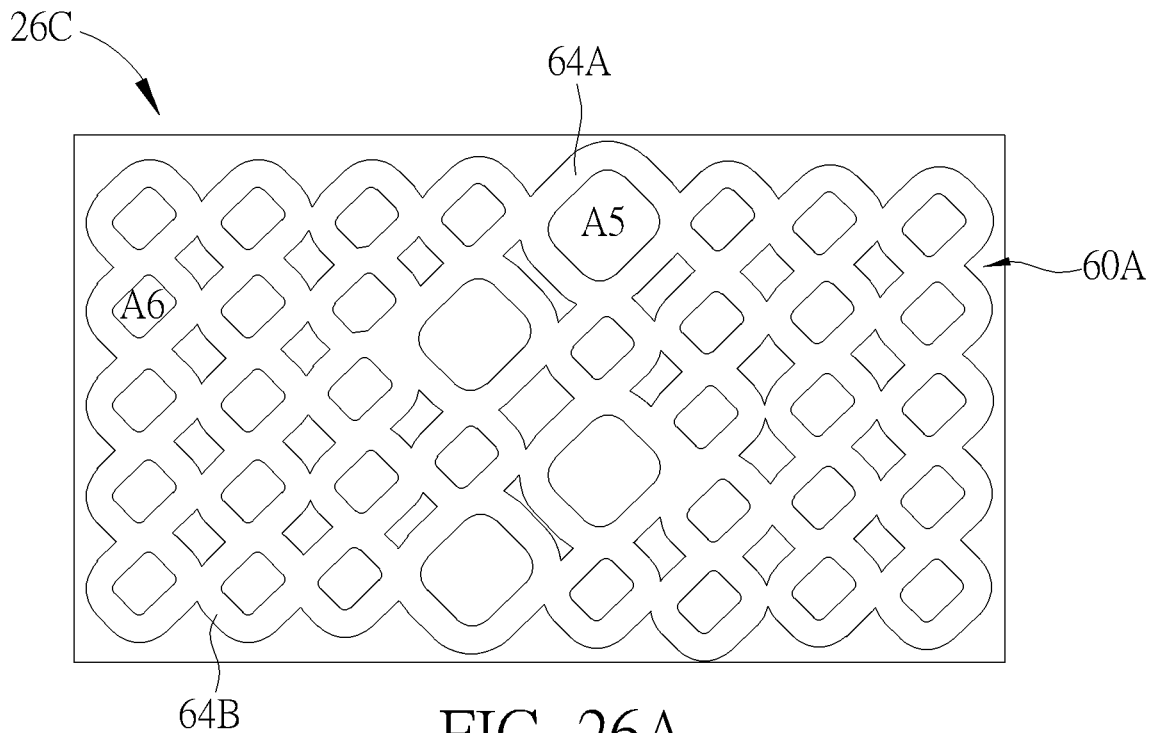
Figure 26B:
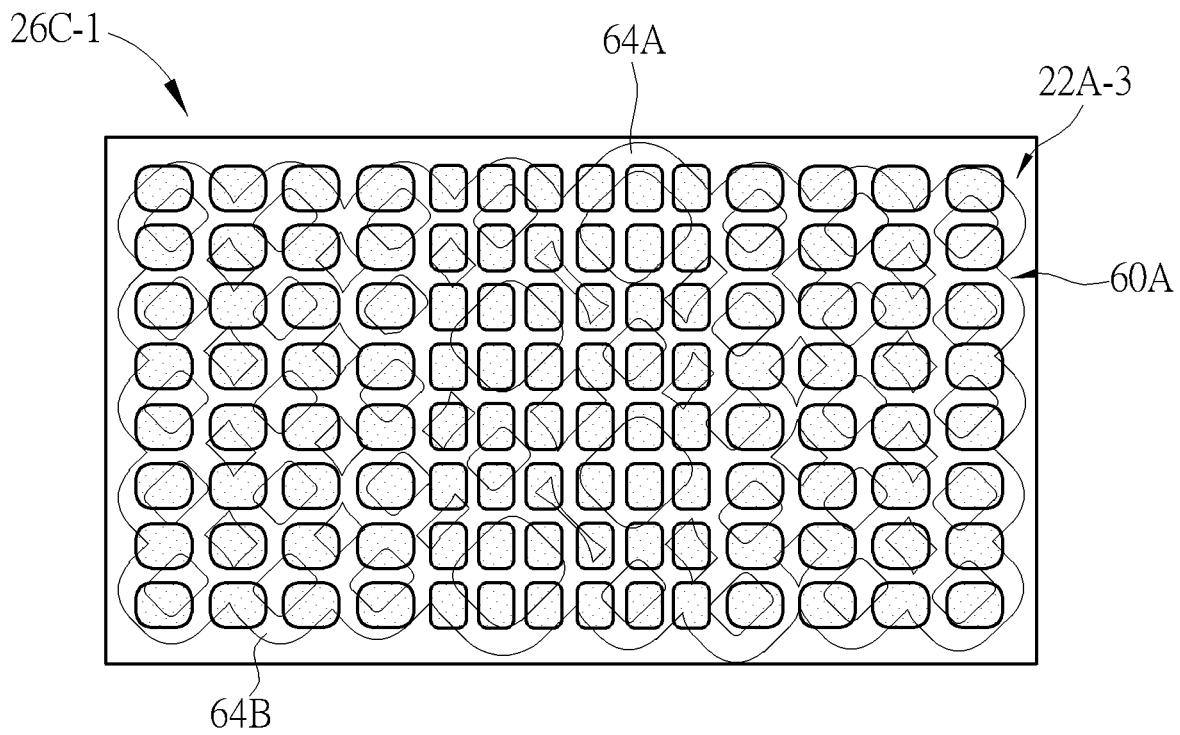

Referring to FIG. 26A, shown is the foldable region 26C with a touch layer 60A comprising an array or matrix of touch mesh type touch units 64A and 64B, wherein the area of the touch units 64A have a respective area with designation A5, and wherein the area of the touch units 64B have a respective area with designation A6, and where A6 is less than A5. In FIG. 26B, the foldable region 26C-1 is shown with the cover window layer 22A-3 disposed over the touch layer 60A. Note that there is overlap between the cover window layer units 36A-4 and the touch units 64A. The minimum touch unit area (A6) is greater than the maximum cover window unit area (units 36A-5).

Figure 27A:
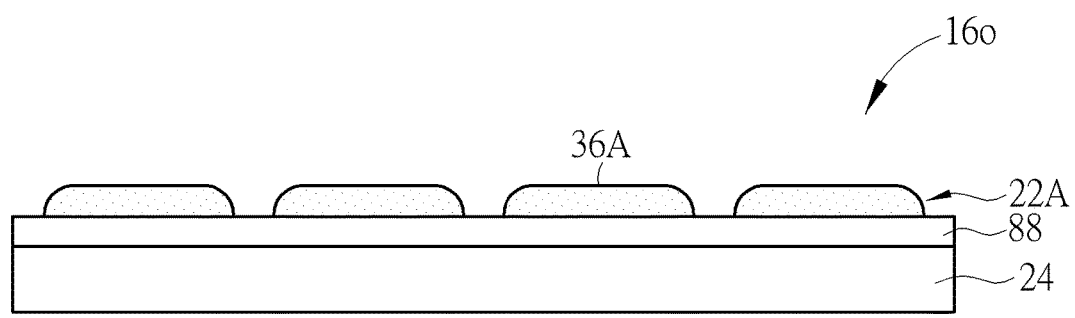
FIGS. 27A-27B are schematic diagrams that illustrate, in cross-sectional view, an embodiment of a flexible touch display device comprising a base layer.
Figure 27B:
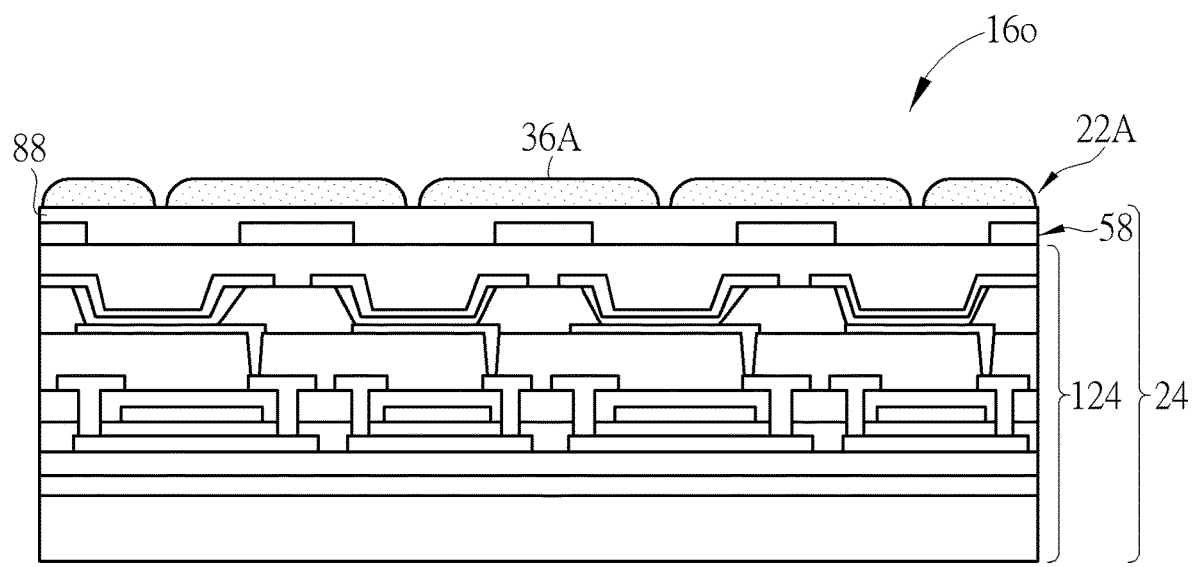

Having described some example relative dimensions for particular parameters that influence the reliability of certain embodiments of a flexible touch display device, attention is directed to FIGS. 27A-27B, which illustrate an embodiment of a flexible touch display device. Referring to FIGS. 27A-27B, shown is a flexible touch display device 16o comprising a patterned cover window layer 22A having plural cover window layer units 36A disposed over a base layer 88, the base layer 88 disposed over a touch display panel 24. In some embodiments, the base layer 88 may be a separate layer from the cover window layer 22A. The cover window layer units 36A may be comprised of a material having a hardness that is higher than that of the material of the base layer 88. In one embodiment, the pencil hardness of the cover window layer units 158 may be 5H or more. The material of the base layer 88 may be comprised of a polyester resin, among other material. Referring more specifically to FIG. 27B, the base layer 88 is disposed between a touch layer 58 (e.g., touch layer 58 of FIG. 16A, though mesh type touch layers, similar to that shown in FIG. 16B, may be used) and the cover window layer 22A. In one embodiment, the base layer 88 is a polarizer (e.g., to affect the optical properties of the flexible touch display device 16o).

Figure 28A:
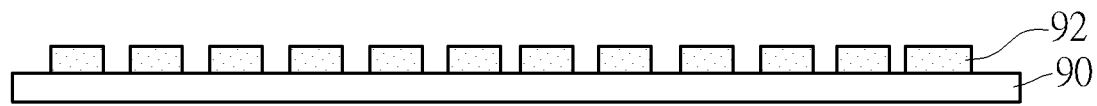
FIGS. 28A-28C are schematic diagrams that illustrate, in cross-sectional view, formation of a cover window layer, touch layer, and polarizer layer for an embodiment of a flexible touch display device.
Figure 28B:
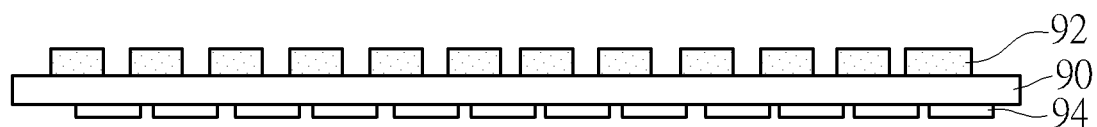
Figure 28C:
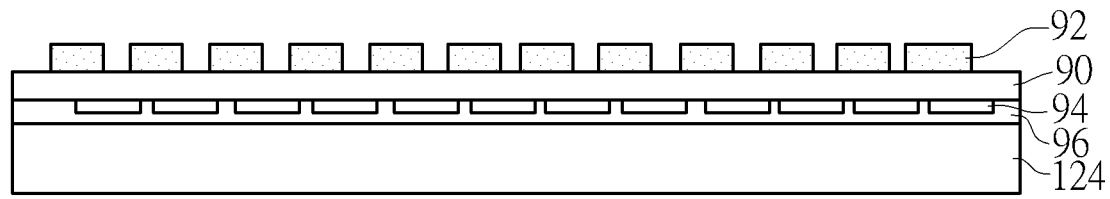

Referring to FIGS. 28A-28C, shown is one method embodiment for forming a cover window layer, touch layer, and base (polarizer) layer for an embodiment of a flexible touch display device. Referring to FIG. 28A, shown is an optical film 90 comprising a polarizer substrate. A cover window layer (glass) 92 is deposited and patterned over the optical film 90. Referring to FIG. 28B, the touch electrodes of the touch layer 94 are formed on the backside of the optical film 90. In FIG. 28C, an adhesive layer 96 is formed on the touch layer 94, and a display panel 124 is formed on the adhesive layer 96.

Figure 29A:
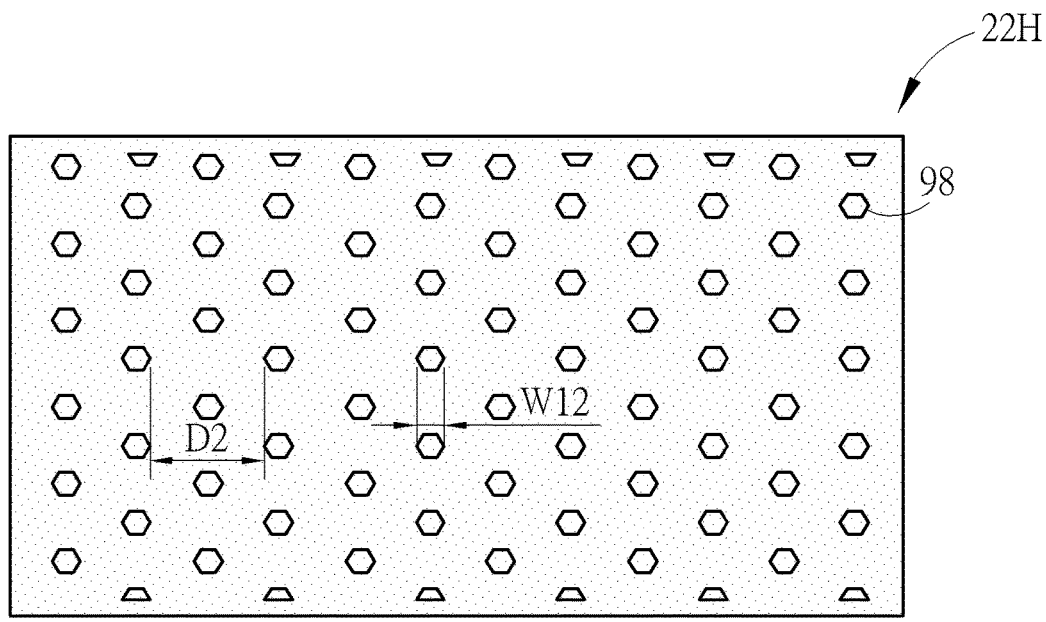
FIGS. 29A-29E are schematic diagrams that illustrate example cover window layers with recessed patterns of units for an embodiment of a flexible touch display device.
Figure 29B:
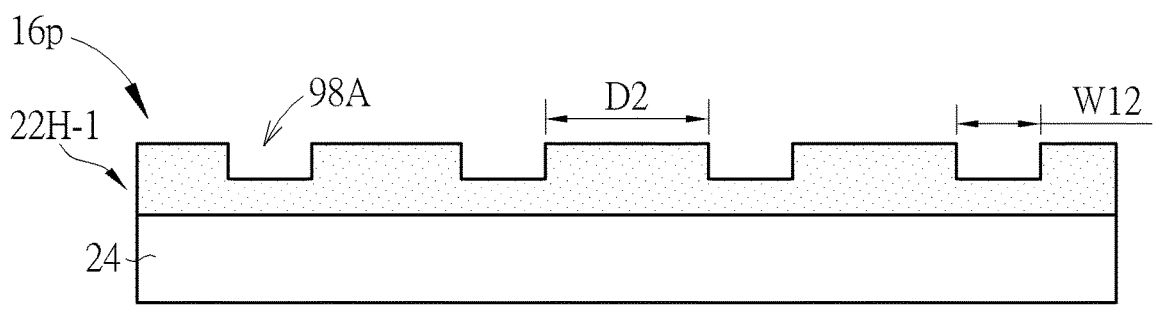
Figure 29C:
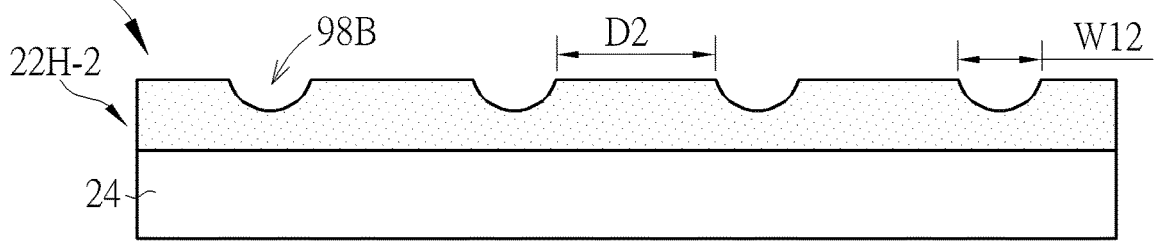
Figure 29D:
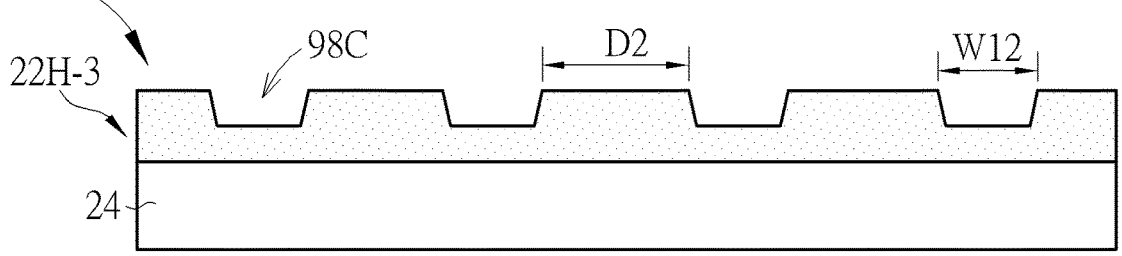
Figure 29E:
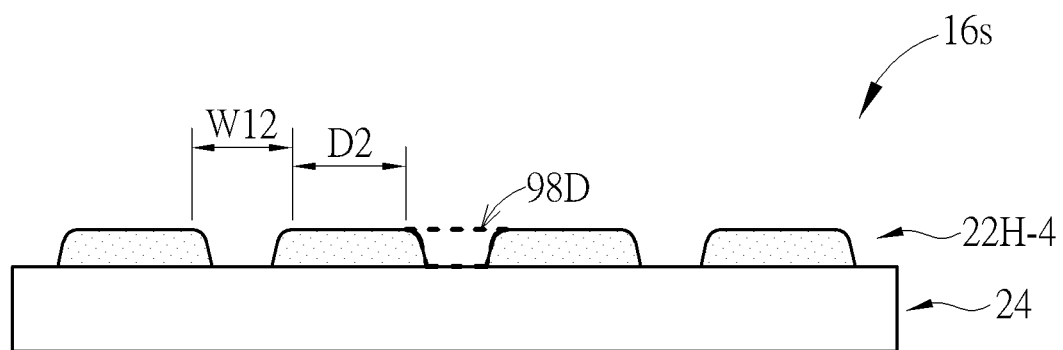

Referring now to FIGS. 29A-29E, shown are example cover window layers with recessed patterns for a foldable region of an embodiment of a flexible touch display device. Referring to FIG. 29A, shown is a top view of a cover window layer 22H with an array or matrix of cover window layer units 98 configured as recesses (not protrusions). The cover window layer units 98 are also referred to herein as recessed units 98. Dimensions for parameters of interest include a recessed spacing distance (D2), which indicates a distance between adjacent recessed units 98 (e.g., along a row). Also depicted is a recessed unit width (W12). Referring to FIGS. 29B-29E, shown are cross-sectional views of flexible touch display devices 16p, 16q, 16r, and 16s respectively, that illustrate relative dimensions for parameters of interest, and also the different configurations or shapes of the recessed units 98. In FIG. 29B, a flexible touch display device 16p is shown, with a cover window layer 22H-1 comprising plural recessed units 98A configured as square or rectangular type recesses. The spacing distance (D2) between recessed units 98A is greater than the recessed unit width (W12). The cover window layer 22H-1 is disposed over a touch display panel 24. Referring to FIG. 29C, a flexible touch display device 16q is shown, with a cover window layer 22H-2 comprising plural recessed units 98B configured as round or curved recesses. The spacing distance (D2) between recessed units 98B is greater than the recessed unit width (W12). The cover window layer 22H-2 is disposed over a touch display panel 24. In FIG. 29D, a flexible touch display device 16r is shown, with a cover window layer 22H-3 comprising plural recessed units 98C configured as angled recesses. The spacing distance (D2) between recessed units 98C is greater than the recessed unit width (W12). The cover window layer 22H-3 is disposed over a touch display panel 24. In FIG. 29E, a flexible touch display device 16s is shown, with a cover window layer 22H-4 comprising plural recessed units 98D. The recessed units 98D is configured as narrower to wider from base to top. The spacing distance (D2) between recessed units 98D is greater than the recessed unit width (W12). The cover window layer 22H-4 is disposed over a touch display panel 24.

Figure 30A:
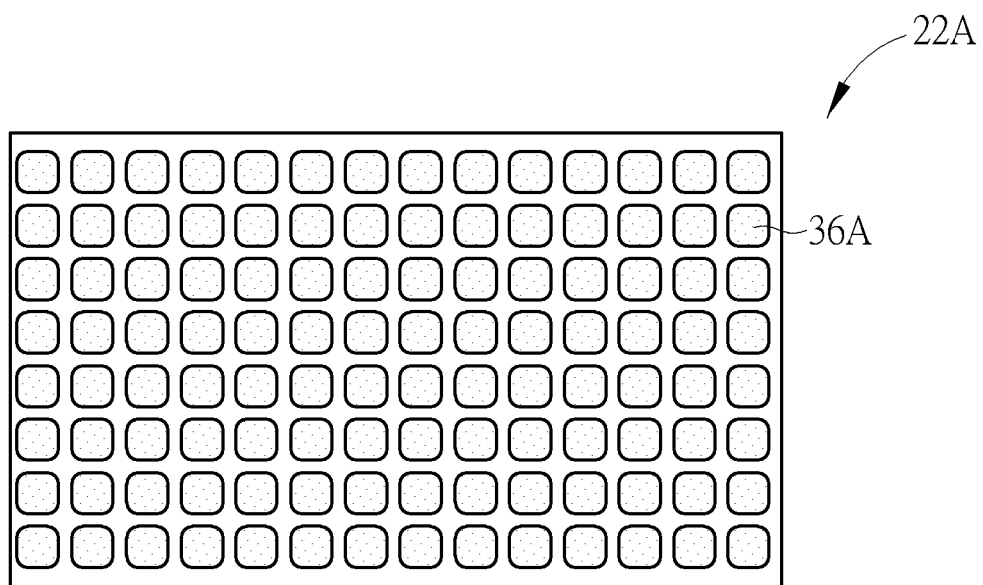
FIGS. 30A-30C are schematic diagrams that illustrate example cover window layer units configured as protrusions and example relative dimensions for an embodiment of a flexible touch display device.
Figure 30B:
Figure 30C:
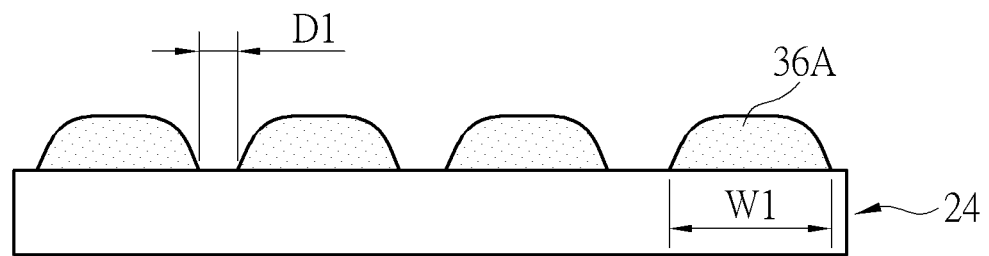

FIGS. 30A-30C are schematic diagrams that illustrate example cover window layer units configured as protrusions and example relative dimensions for an embodiment of a flexible touch display device. Referring to FIG. 30A, shown is a cover window layer 22A comprising an array or matrix of cover window layer units 36A configured as respective protrusions. Referring to FIG. 30B, a cover window layer unit 36A is shown with rounded edges, though other configurations for a protrusion may be used. Referring to FIG. 30C, the spacing distance (D1) between the units 36A is less than the unit width (W1).

Figure 31:
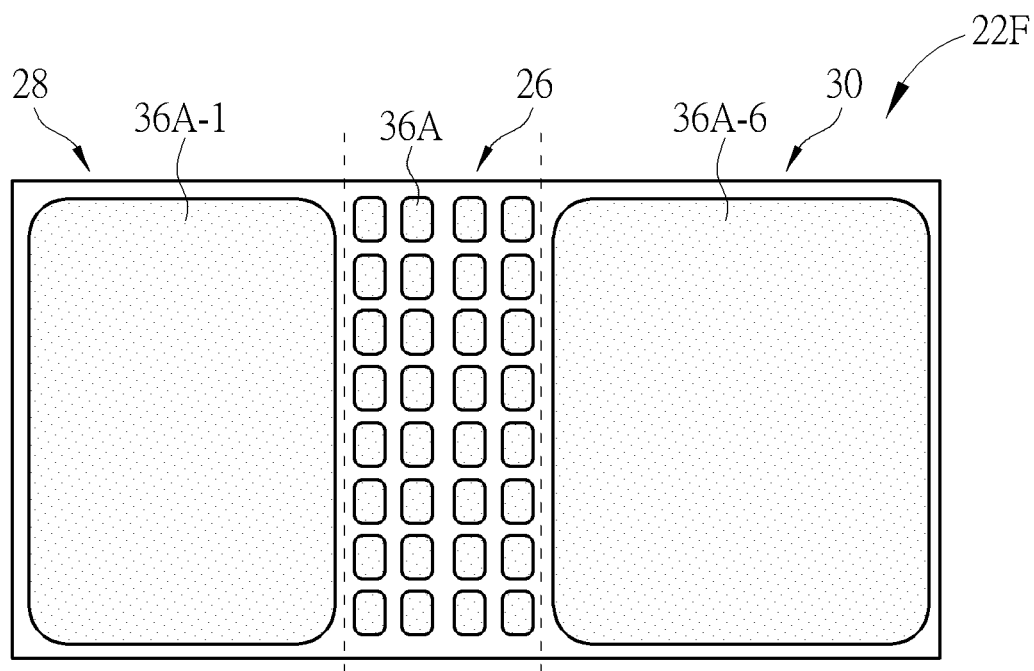
FIG. 31 is a schematic diagram that illustrates example cover window layer units configured as protrusions among different regions of a cover window layer for an embodiment of a flexible touch display device.

Referring to FIG. 31, shown is a schematic diagram that illustrates example cover window layer units among different regions of a cover window layer for an embodiment of a flexible touch display device. For instance, a cover window layer 22F (similar to FIG. 15B) is shown in top plan view, including a foldable region 26 and two flat regions 28, 30. In the foldable region 26, shown is an array or matrix of cover window layer units 36A configured as protrusions. In the flat regions 28 and 30, shown are respective (single) cover window layer units 36A-1, 36A-6 configured as protrusions.

Figure 32:
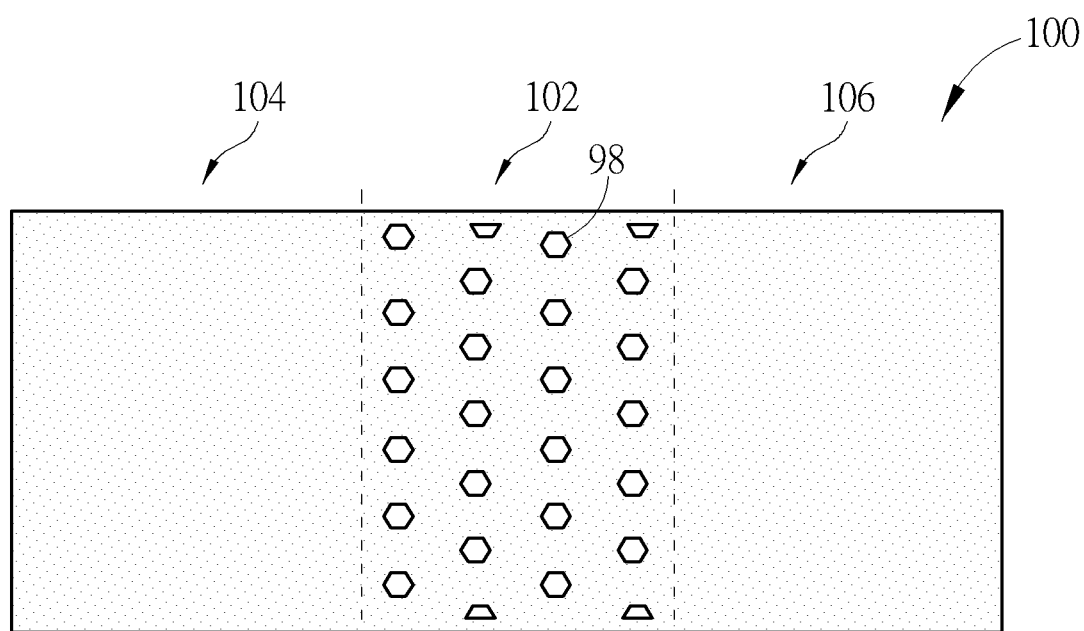
FIG. 32 is a schematic diagram that illustrates example cover window layer units configured as recesses and disposed in a select region of a cover window layer for an embodiment of a flexible touch display device.

FIG. 32 is a schematic diagram that illustrates example cover window layer units disposed in a select region of a cover window layer for an embodiment of a flexible touch display device. For instance, a cover window layer 100 is shown in top plan view, including a foldable region 102 and two flat regions 104, 106. In the foldable region 102, shown is an array or matrix of cover window layer units 98 configured as recesses. The flat regions 104, 106 comprise no units.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality. Further, note that reference to a structure (e.g., first structure) that is disposed on (or over) a substrate includes the presence of one or more intermediate structures between the first structure and the substrate. In addition, the meaning that the second structure is disposed on (or over) the first structure can refer to that the second structure is directly disposed on the first structure (with no intermediate structure between the first and second structures), or can refer to that the second structure is indirectly disposed on the first structure (in the presence of one or more intermediate structures between the first and second structures). Also, pattern and unit is used interchangeably herein. Further, variations (e.g., in size, geometry) of a given structure or component (e.g., units, layers, etc.) that is similar in principle are provided herein with a suffix of a reference numeral, or a combination of a suffix and appended numeral to the reference numeral. For instance, a unit in a cover window layer may be referenced using reference numeral 36, yet different geometries of a cover window layer unit are distinguished by using a suffix (e.g., 36A for rounded edges, 36B for hexagonal geometries), or different areas or other differences denoted using the suffix and a hyphened numeral (e.g., 36A-1 for a rounded cover window layer unit of one size, and 36A-6 for a rounded unit of a different size) for a component or structure that is similar in principle. Note that certain examples are depicted using a particular geometry and/or area dimension (or complete etch versus partial etch), with the understanding that, to the extent that performance is similar, various geometries, areas, and/or type of etch may be interchangeable in some embodiments. Though described using different embodiments, features from some embodiments may be interchangeable with, combined, or replaced with features from other embodiments. Reference to the terms first and second or the like are used as a method of distinction in the claims, and not necessarily limited to use of that term in the specification. Also, cover window layers are to be construed as patterned (e.g., with plural protrusions or recesses) in all figures except FIGS. 1A-1B.

What is claimed is:

1. A touch display device, comprising:
    a substrate including a foldable region;
    a display layer disposed on the substrate;
    a touch layer including a plurality of touch units on the foldable region of the substrate; and
    a cover window layer disposed on the touch layer, wherein the cover window layer includes a plurality of patterns disposed on the foldable region of the substrate,
    wherein at least one of the plurality of touch units partially overlaps with at least two of the plurality of patterns of the cover window layer, and the at least one of the plurality of patterns is directly touchable from outside.

2. The touch display device as claimed in claim 1, wherein the plurality of patterns are protrusions.

3. The touch display device as claimed in claim 1, wherein the plurality of patterns are recesses.

4. The touch display device as claimed in claim 1, wherein the at least one of the plurality of patterns has a profile in a cross-sectional view, and at least a part of the profile is curved.

5. The touch display device as claimed in claim 1, wherein two adjacent patterns of the plurality of patterns are spaced from a spacing distance, and the spacing distance is less than a width of one of the two adjacent patterns of the plurality of the patterns.

6. The touch display device as claimed in claim 1, wherein the at least one of the plurality of touch units includes an opening and a touch enclosing part enclosing the opening.

7. The touch display device as claimed in claim 1, wherein the cover window layer further includes a base layer disposed between the touch layer and the plurality of patterns.

8. The touch display device as claimed in claim 1, wherein an edge of one of the plurality of patterns is touched by a touch object.

9. A touch display device, comprising:
a substrate including a foldable region;
a display layer disposed on the substrate;
a touch layer including a plurality of touch units on the foldable region of the substrate; and
a cover window layer disposed on the touch layer, wherein the cover window layer includes a plurality of patterns disposed on the foldable region of the substrate,
wherein an area of at least one of the plurality of touch units is greater than an area of at least one of the plurality of patterns in a top view, and the at least one of the plurality of patterns is directly touchable from outside.

10. The touch display device as claimed in claim 9, wherein the plurality of patterns are protrusions.

11. The touch display device as claimed in claim 9, wherein the plurality of patterns are recesses.

12. The touch display device as claimed in claim 9, wherein the at least one of the plurality of patterns has a profile in a cross-sectional view, and at least a part of the profile is curved.

13. The touch display device as claimed in claim 9, wherein two adjacent patterns of the plurality of patterns are spaced from a spacing distance, and the spacing distance is less than a width of one of the two adjacent patterns of the plurality of the patterns.

14. The touch display device as claimed in claim 9, wherein the at least one of the plurality of touch units includes an opening and a touch enclosing part enclosing the opening.

15. The touch display device as claimed in claim 9, wherein the cover window layer further includes a base layer disposed between the touch layer and the plurality of patterns.

16. The touch display device as claimed in claim 9, wherein an edge of one of the plurality of patterns is touched by a touch object.

* * * * *